United States Patent
Moselund

(10) Patent No.: US 12,332,476 B2
(45) Date of Patent: *Jun. 17, 2025

(54) LONG WAVELENGTH GENERATION IN OPTICAL FIBER

(71) Applicant: NKT Photonics A/S, Birkerød (DK)

(72) Inventor: Peter Morten Moselund, Copenhagen N (DK)

(73) Assignee: NKT Photonics A/S, Birkerød (DK)

(*) Notice: Subject to any disclaimer, the term of this patent is extended or adjusted under 35 U.S.C. 154(b) by 0 days.

This patent is subject to a terminal disclaimer.

(21) Appl. No.: 18/641,121

(22) Filed: Apr. 19, 2024

(65) Prior Publication Data

US 2024/0264362 A1 Aug. 8, 2024

Related U.S. Application Data

(63) Continuation of application No. 14/416,887, filed as application No. PCT/DK2013/050248 on Jul. 22, 2013, now Pat. No. 12,001,051.

(Continued)

(51) Int. Cl.
*G02F 1/35* (2006.01)
*G02B 6/02* (2006.01)
*G02F 1/365* (2006.01)

(52) U.S. Cl.
CPC ....... *G02B 6/02214* (2013.01); *G02F 1/3513* (2013.01); *G02F 1/353* (2013.01); *G02F 1/365* (2013.01); *G02F 1/3528* (2021.01)

(58) Field of Classification Search
CPC .............. G02B 6/02214; G02B 6/0228; G02B 6/02252; G02F 1/3513; G02F 1/353; G02F 1/3536; G02F 1/365; G02F 2001/3528

(Continued)

(56) References Cited

U.S. PATENT DOCUMENTS

| 4,749,666 A | 6/1988 | Lucas et al. |
| 5,480,845 A | 1/1996 | Maze et al. |

(Continued)

FOREIGN PATENT DOCUMENTS

| EP | 1655625 A1 | 5/2006 |
| EP | 1870747 A1 | 12/2007 |

(Continued)

OTHER PUBLICATIONS

"Flat, broadband supercontinuum generation at low pulse energies in a dispersion-tailored led-silicate fibre" by Ponzo et al, ECOC Technical Digest, paper We.10.P1.09, 2011.

(Continued)

*Primary Examiner* — Robert Tavlykaev
(74) *Attorney, Agent, or Firm* — Boone IP Law

(57) ABSTRACT

A supercontinuum source including a pump light source arranged to emit pump light and a nonlinear fiber having a core arranged to receive the pump light. The supercontinuum includes infrared wavelengths generated in the nonlinear fiber from the pump light. The nonlinear fiber has a dispersion profile including a zero dispersion wavelength, a positive peak value at a peak wavelength longer than the zero dispersion wavelength, a minimum value of dispersion at a minimum wavelength longer than the peak wavelength. The pump light is arranged to include substantial energy at one or more preferred pump wavelengths which are 10 nm longer than the zero dispersion wavelength or more. Also, a supercontinuum pump source including a nonlinear fiber having a core including a fluoride glass and having a core diameter smaller than 7 μm, where the fiber has a numerical aperture of more than 0.26.

23 Claims, 16 Drawing Sheets

Related U.S. Application Data

(60) Provisional application No. 61/674,475, filed on Jul. 23, 2012.

(58) Field of Classification Search
USPC .................................... 385/122; 372/3, 4, 6
See application file for complete search history.

(56) References Cited

U.S. PATENT DOCUMENTS

| | | |
|---|---|---|
| 5,774,620 A | 6/1998 | Nishida et al. |
| 6,198,870 B1 | 3/2001 | Kubota et al. |
| 6,277,776 B1 | 8/2001 | Clare et al. |
| 6,490,081 B1 | 12/2002 | Feillens et al. |
| 6,516,124 B2 | 2/2003 | Po |
| 7,003,206 B2 | 2/2006 | Tankala et al. |
| 7,062,137 B2 | 6/2006 | Farroni et al. |
| 7,403,688 B2 | 7/2008 | Knox et al. |
| 7,634,164 B2 | 12/2009 | Farroni et al. |
| 2002/0080474 A1 | 6/2002 | Ohishi et al. |
| 2005/0271094 A1 | 12/2005 | Miller et al. |
| 2006/0010921 A1 | 1/2006 | Mori et al. |
| 2006/0210227 A1 | 9/2006 | Shaw et al. |
| 2009/0028193 A1 | 1/2009 | Islam |
| 2009/0245729 A1 | 10/2009 | Dong et al. |
| 2012/0027031 A1 | 2/2012 | Liu |
| 2012/0093469 A1 | 4/2012 | Dong et al. |
| 2012/0236314 A1 | 9/2012 | Fermann et al. |
| 2012/0281720 A1 | 11/2012 | Fermann et al. |

FOREIGN PATENT DOCUMENTS

| | | |
|---|---|---|
| EP | 1975655 A2 | 10/2008 |
| WO | 2006/078964 A2 | 7/2006 |
| WO | 2007/007722 A1 | 1/2007 |
| WO | 2007/061732 A2 | 5/2007 |

OTHER PUBLICATIONS

"10.5W time-averaged power mid-IR supercontinuum generation extending beyond 4 mm with direct pulse pattern modulation" by Xia et al., IEEE Journal of Selected Topics in Quantum Electronics, vol. 15, No. 2, pp. 422-434, 2009.

"All-solid nonlinear singlemode fibers with a tailored dispersion profile" by Poletti et al., Optics Express, vol. 19, No. 1, pp. 66-80, 2011.

"Generation of a Continuum Extending to the Midinfrared by Pumping ZBLAN Fiber With an Ultrafast 1550-nm Source" by Hagen et al, IEEE Photonics Technology Letters, vol. 18, No. 1, pp. 91-93, 2006.

"Infrared spectroscopy", Wikipedia article, available online since at least Oct. 6, 2011.

"Supercontinuum generation in photonic crystal fiber" by Dudley et al, Reviews of Modern Physics, vol. 78, pp. 1135-1184, 2006.

Decision to grant a European patent received for European Application No. 13822614.7, mailed on Jan. 31, 2019, 2 pages.

European Search Report and Search Opinion received for EP Application No. 13822614.7, mailed on Jan. 25, 2016, 10 pages.

Intention to Grant received for European Application No. 13822614.7, mailed on Apr. 25, 2018, 6 pages.

Intention to Grant received for European Application No. 13822614.7, mailed on Dec. 13, 2017, 6 pages.

Intention to Grant received for European Application No. 13822614.7, mailed on Sep. 17, 2018, 6 pages.

International Preliminary Report on Patentability received for PCT Patent Application No. PCT/DK2013/050248, mailed on Feb. 5, 2015, 9 pages.

International Search Report and Written Opinion received for PCT Patent Application No. PCT/DK2013/050248, mailed on Oct. 8, 2013, 11 pages.

Jiang, "Deep-ultraviolet to mid-infrared supercontinuum generated in solid-core ZBLAN photonic crystal fibre" Nature Photonics, Jan. 19, 2015, Advance online publication. (7 pages).

Kulkarni et al., "Supercontinuum generation from-1.9 to 4.5 µm in ZBLAN fiber with high average power generation beyond 3.8 µm using a thulium-doped fiber amplifier", Journal Optical Society of America B, Oct. 2011, vol. 28, No. 10, pp. 2486-2498, XP055123908.

Liao, "Fabrication and characterization of a chalcogenide-tellurite composite microstructure fiber with high nonlinearity" Optics Express, Nov. 11, 2009, p. 21608-21614, vol. 17, No. 24. (7 pages).

Meisong et al., "Supercontinuum Generation in a Chalcogenide-Tellurite Composite Microstructure Fiber", ECOC 2009, Sep. 20-24, 2009, pp. 1-2, XP031546370.

Office Action received for European Application No. 13822614.7, mailed on Feb. 18, 2017, 5 pages.

Saad, "Fluoride Glass Fiber: State of The Art" Proc. of SPIE, 2009, p. 73160N1-16, vol. 7316. (16 pages).

Tiwari et al., "Two-Octave Spanning Supercontinuum in a Soft Glass Photonic Crystal Fiber Suitable for 1.55 µm Pumping", Journal of Lightwave Technology, Dec. 1, 2011, vol. 29, No. 23, pp. 3560-3565, XP011380158.

Wang et al., "Generation of a mid-infrared broadband polarized supercontinuum in As2Se3 photonic crystal fibers", Chinese Physics B, May 3, 2012, vol. 21, No. 5, pp. 054220-1-054220-S, XP020222779.

Zhigang Chen et al., "Soliton dynamics in non-uniform fiber tapers: analytical description through an improved moment method"; Journal of the Optical Society of America; vol. 27, No. 5, May 2010, pp. 1022-1030.

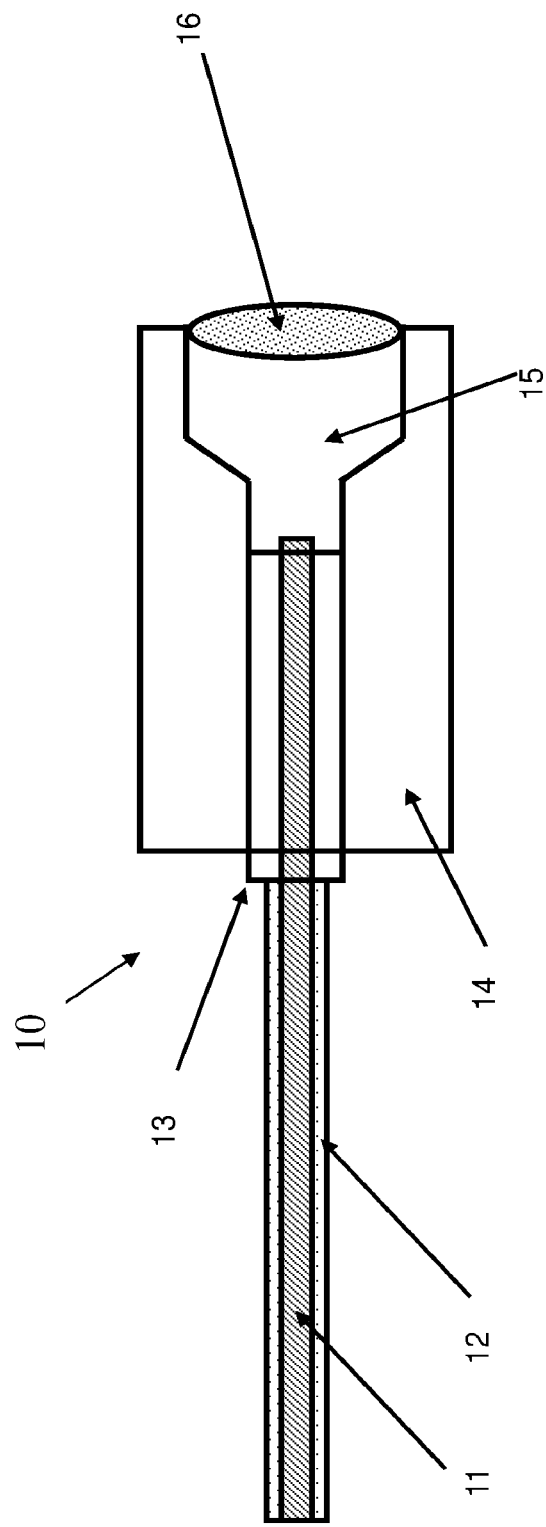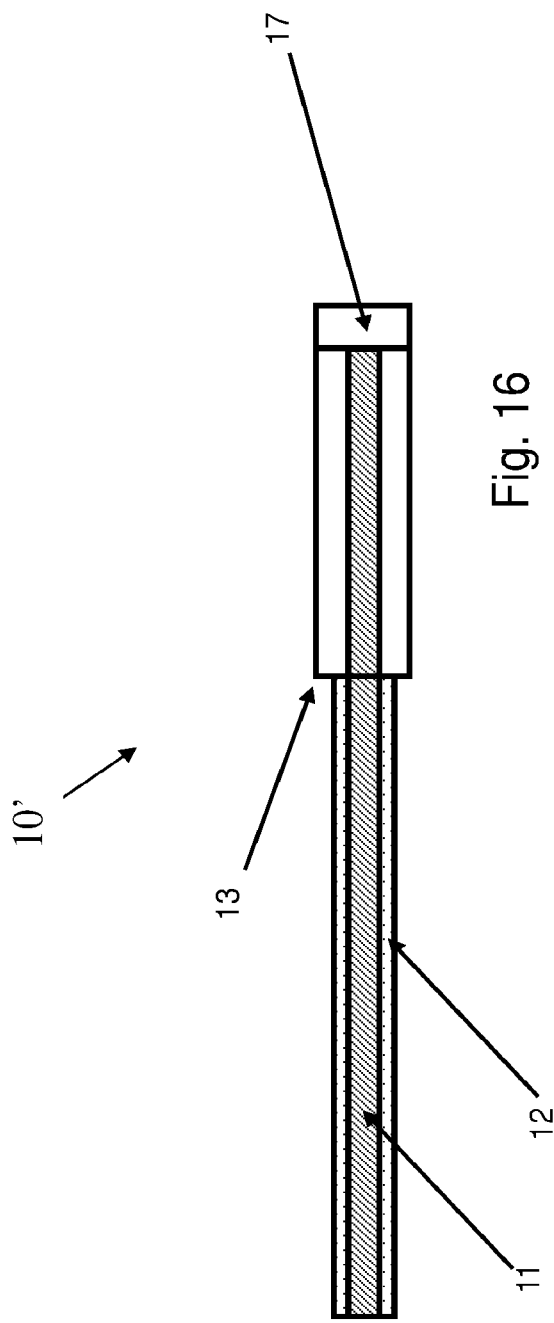

LONG WAVELENGTH GENERATION IN OPTICAL FIBER

CROSS REFERENCE TO RELATED APPLICATIONS

The present application is a continuation of U.S. application Ser. No. 14/416,887, filed on Jan. 23, 2015, which is a U.S. national stage of International Application No. PCT/DK2013/050248, filed on Jul. 22, 2013, which claims the benefit of U.S. Provisional Application No. 61/674,475, filed on Jul. 23, 2012. The entire contents of each of U.S. application Ser. No. 14/416,887, International Application No. PCT/DK2013/050248, and US Provisional Application No. 61/674,475 are hereby incorporated herein by reference in their entirety.

TECHNICAL FIELD

The present invention in one embodiment relates to a supercontinuum light source optimized for the generation of long wavelength light and utilizing a fiber with a dispersion profile pumped with a laser. In one embodiment the dispersion profile allows a supercontinuum to be more efficiently broadened and may result in a supercontinuum which reaches longer wavelengths or which is generated with pump light with a lower peak power.

BACKGROUND OF THE INVENTION

A supercontinuum light source is a light source which exhibits broad flat spectrum and laser-like properties of high output power and high degree of spatial coherence compared to thermal light sources. The supercontinuum is typically generated from wavelength conversion of pump light through interactions of the laser radiation and a nonlinear fiber. The generation of a supercontinuum often includes nonlinear processes such as self-phase modulation (SPM), cross-phase modulation (XPM), stimulated Raman scattering (SRS), and four-wave mixing (FWM) all of which may contribute to the generated supercontinuum.

In this context the term "broad spectrum" refers to a spectrum broader than 25 nm, such as broader than 50 nm, such as broader than 100 nm, such as broader than 100 nm, such as broader than 250 nm, such as broader than 500 nm, such as broader than 750 nm, such as broader than 1000 nm, such as broader than 1500 nm, such as broader than 2000 nm, such as broader than 2500 nm, such as broader than 3000 nm, such as broader than 4000 nm, such as broader than 6000 nm depending on pump and nonlinear fiber characteristics.

In case the light source is a short pulse light source which emits one or more pulses whose temporal full width half maximum is less than 250 fs, the spectrum has a width broader than 10 nm, such as broader than 25 nm, such as broader than 50 nm, such as broader than 75 nm, such as broader than 100 nm, such as broader than 125 nm, such as broader than 150 nm, such as broader than 175 nm, such as broader than 200 nm, such as broader than 250 nm, such as broader than 500 nm.

In the context of the present invention, the end-points of the broad spectrum are taken to be where the power spectral density has dropped to less than 21 dBm/nm below the average power spectral density, such as to less than 31 dBm/nm below the average power spectral density, such as to less than 41 dBm/nm below the average power spectral density, such as to less than 51 dBm/nm below the average power spectral density.

In the context of the present invention the degree of spatial coherence of the source can be determined according to the definition of spatial coherence in Encyclopedia of Laser Physics and Technology: "Spatial coherence means a strong correlation (fixed phase relationship) between the electric fields at different locations across the beam profile. For example, within a cross-section of a beam from a laser with diffraction-limited beam quality, the electric fields at different positions oscillate in a totally correlated way, even if the temporal structure is complicated by a superposition of different frequency components. Spatial coherence is the essential prerequisite of the strong directionality of laser beams".

It should be noted that for this and all power spectral densities referred to in this disclosure we refer to a power spectral density plotted with a resolution of 1 nm even if this means that peaks in the spectrum narrower than 1 nm will be smeared out and recorded as having lower power spectral density than would be the case if they were plotted with a higher resolution.

In the context of the present invention the term "flat spectrum" refers to a spectrum having no dips in the broad spectrum where the spectral power density is less than 50 dB/nm below the average spectral power density of the broad spectrum, such as less than 35 dB/nm below the average, such as less than 20 dB/nm below the average, such as less than 10 dB/nm below the average, such as less than 5 dB/nm below the average, such as less than 3 dB/nm below the average, such as less than 1 dB/nm below the average.

In some supercontinuum light sources, the generation of some wavelengths longer than the pump wavelengths involves soliton effects. Solitons are pulses of light that can propagate unchanged along an optical fiber because they are maintained through an interaction between non-linear effects and fiber dispersion and have a shape where the relationship between their length ($T_0$) and peak power ($P_0$) satisfy the following equation:

$$N^2 = \frac{\gamma P_0 T_0^2}{|\beta_2|} = \frac{2\pi n_2 P_s T_0^2}{A_{\mathit{eff}} |\beta_2|} = \frac{8 n_2 P_s T_0^2}{MFD^2 |\beta_2|} \qquad \text{Eq. 1}$$

where $\gamma$ is the fiber nonlinearity, $P_s$ is the peak power of the soliton, $T_0$ is half-width (1/e-intensity point) the temporal length of the soliton, $\beta_2$ is the group velocity dispersion parameter, $n_2$ is the nonlinear refractive index of the relevant material, $A_{\mathit{eff}}$ is the effective modefield area and MFD is the mode field diameter. $\gamma$, $A_{\mathit{eff}}$ and MFD are all wavelength dependent. The number N is known as the soliton number or soliton order and a soliton with N=1 is known as a fundamental soliton. Fundamental solitons can adapt their temporal shape in order to maintain N≈1 even when fiber parameters change provided that the change in the fiber changes occur slowly enough. Such propagation where the soliton has time to adapt its shape is called adiabatic propagation.

Solitons normally require an anomalous dispersion (positive D) and can be short and intense pulses which can take part in a number of wavelength conversion processes. One of these processes is soliton self frequency shift (SSFS), also called Raman shifting or red-shifting which describes how the Raman effect causes a soliton to gradually shift its center wavelength to longer wavelengths as it propagates. The Raman effect is the transfer of energy from a photon propagating in a material to certain resonant phonon vibrations in the material by which process the energy of the photon is reduced, its frequency decreased and its wavelength increased. Due to the Raman shifting a short pulse or soliton, e.g. in silica a pulse with a length of less than approx. 1 ps, will gradually shift toward longer wavelengths. In the case of a soliton, this wavelength shift can be described as the shift in the soliton's carrier frequency $v=c/\lambda=\omega/2\pi$ using the following equations:

$$\frac{dv_0}{dz} = -\frac{8|\beta_2|T_R}{2\pi 15 T_0^4} = -\frac{T_R \gamma^4}{60\pi |\beta_2|^3} E_s^4 = -\frac{1024 n_2^4}{15\pi} \frac{E_s^4}{MFD^8 \lambda^4} \frac{T_R}{|\beta_2|^3} \quad \text{Eq. 2}$$

Where c is the speed of light and $\lambda$ is the wavelength, $\omega$ is the angular frequency, $T_R$ is a pulse length dependent Raman parameter which decreases with decreasing pulse length as described in "Soliton dynamics in non-uniform fiber tapers: analytical description through an improved moment method" by Z. Chen et al., Journal of the Optical Society of America B, Vol. 27, No 5 pp 1022-1030 (2010). $\gamma$ is the fiber nonlinearity, $E_s$ is the energy of the soliton, $n_2$ is the nonlinear index of the glass, MFD is the wavelength depending effective mode field diameter, and $\beta_2$ is the group velocity dispersion parameter.

SUMMARY OF THE INVENTION

In one embodiment the dispersion profile of the nonlinear fiber is optimized in order to ensure that the above mentioned red-shift is stronger and is continued for longer. The effective mode field diameter will normally increase with wavelength and the energy of the soliton will decrease with wavelength as it red-shifts due to the photon energy loss inherent in photon conversion through the Raman effect. In total this means that if the dispersion is constant or increasing the red-shift will gradually slow down as $E_s^4/(MFD^8\lambda^4)$ decreases. However, if the wavelength of the pump and the shape of the dispersion profile are optimized to provide a decreasing dispersion this can be made to provide that for some wavelength intervals an increase in the term $T_R/|\beta_2|^3$ compensates for the decrease in $E_s^4/(MFD^8\lambda^4)$. In one embodiment "compensates" is taken to mean that the term balances the effect of the decrease. In one embodiment "compensates" is taken to mean that the term reduces the effect of the decrease by 10% or more, such as by 20% or more, such as by 30% or more, such as by 40% or more, such as by 50% or more, such as by 60% or more, such as by 70% or more, such as by 80% or more, such as by 90% or more, such as by 100% or more. In one embodiment "compensates" is taken to mean that the term overcompensate the effect of the decrease, i.e. compresses the solitons so that the rate of their red-shift is increased by more than 10% at the minimum wavelength compared to at the peak wavelength and the minimum, such as more than 20%, such as 30% or more, such as 40% or more, such as by 50% or more, such as 75% or more, such as 100% or more, such as 150% or more, such as 250% or more, such as 500% or more, such as 1000% or more, such as 1500% or more, such as 2000% or more, such as 5000% or more, such as 10000% or more.

In one the embodiment the nonlinear fiber is pumped at wavelengths where the dispersion is relatively high so that it is possible to have a negative gradient on the dispersion curve at wavelengths longer than the pump wavelengths. In one embodiment the preferred one or more pump wavelengths and zero dispersion wavelengths (ZDW) are separated by a significant interval in order for the dispersion to be relatively high at the preferred pump wavelengths. In one embodiment a significant interval is taken to be more than 5 nm, such as more than 10 nm, such as more than 25 nm, such as more than 50 nm, such as more than 100 nm, such as more than 150 nm, such as more than 200 nm, such as more than 250 nm, such as more than 300 nm, such as more than 400 nm, such as more than 500 nm, such as more than 750 nm, such as more than 1000 nm.

In one embodiment the invention relates to a supercontinuum source comprising a pump light source arranged to emit pump light and a nonlinear fiber having a core arranged to receive the pump light where said pump light and nonlinear fiber are arranged so that a supercontinuum comprising infrared wavelengths is generated in the nonlinear fiber from the pump light, the nonlinear fiber having a dispersion profile, $D(\lambda)$, comprising
  a. a zero dispersion wavelength ZDW,
  b. a positive peak value (anomalous dispersion) at a peak wavelength longer than ZDW,
  c. a minimum value of dispersion at a minimum wavelength longer than the peak wavelength,
wherein the pump light is arranged to comprise substantial energy at one or more preferred pump wavelengths which are 10 nm longer than the ZDW or more, such as 25 nm longer or more, such as 50 nm longer or more, such as 100 nm longer or more, such as 150 nm longer or more, such as 200 nm longer or more, such as 300 nm longer or more, such as 400 nm longer or more, such as 500 nm longer or more.

The term "peak value" is taken to mean the value of the dispersion at a peak defined as a local maximum of the dispersion profile. Throughout this text this local maximum peak is referred to as "the peak" unless otherwise clear. In one embodiment the peak is the first local maximum as the wavelength increases from the ZDW. In one embodiment the peak is the second, third, fourth or fifth or higher local maximum as the wavelength increases from the ZDW. Typically the maximum will be well defined with a non-zero slope at either side of the peak wavelength. However, in one embodiment the peak-value is assumed at a positive flat-top which is 200 nm wide or less, such 100 nm wide or less, such 50 nm wide or less, such 25 nm wide or less, such 10 nm wide or less, such 5 nm wide or less. In one embodiment the peak wavelength is taken to be the center wavelength of the flat-top. In one embodiment the peak wavelength is taken to be the shortest wavelength of the flat-top. In one embodiment the peak wavelength is taken to be the longest wavelength of the flat-top.

The term "minimum value" is taken to mean the value of the dispersion at a local minimum of the dispersion profile. Throughout this text this local minimum is referred to as the minimum unless otherwise clear. In one embodiment the minimum is the first local minimum as the wavelength increases from the peak. In one embodiment the minimum is the second, third, fourth or fifth or higher local minimum as the wavelength increases from the ZDW. Typically the minimum will be well defined with a non-zero slope at either side of the minimum wavelength. However, in one embodiment the minimum-value is assumed at a flat valley-bottom which is 200 nm wide or less, such 100 nm wide or less, such 50 nm wide or less, such 25 nm wide or less, such 10 nm wide or less, such 5 nm wide or less. In one embodiment minimum wavelength is taken to be the center wavelength of the valley-bottom. In one embodiment the minimum wavelength is taken to be the shortest wavelength of the valley-bottom. In one embodiment the minimum wavelength is taken to be the longest wavelength of the valley-bottom.

The term zero-dispersion parameter at a given wavelength is taken to mean that the dispersion parameter changes from negative to positive or from positive to negative when comparing two wavelengths close to the ZDW, such as within 10 nm of the ZDW, such as within 5 nm of the ZDW, such as within 1 nm of the ZDW, such as within 0.5 nm, such as within 0.1 nm, such as within 0.01 nm. In one embodiment the ZDW is assumed at a local minimum of the dispersion profile wherein the minimum value is less than 1 ps/(nm km), such as less than 0.1 ps/(nm km), such as less than 0.01 ps/(nm km), such as 01 ps/(nm km). Unless otherwise noted the dispersion referred to in this text will be the dispersion parameter D, while the group velocity dispersion parameter $\beta_2$ will generally be used in equations as is common in the literature. The two dispersion parameters are related through the equation $D=-\beta_2(2\pi c)/\lambda^2$. It is customary in the literature to call the dispersion normal when D is negative and anomalous when D is positive; this terminology is adopted here.

In one embodiment the pump light has a relatively narrow bandwidth such as the output from a laser, i.e. in the order of 10 nm or less, such as in the order or 1 nm or less depending on the pulse duration of the pump light. In one embodiment the pump light has a relatively wide bandwidth such 50 nm or wider, such as 100 nm or wider, such as 200 nm or wider, such as 300 nm or wider, such as 400 nm or wider, such as 500 nm or wider, such as 750 nm or wider, such as 1000 nm or wider. In one embodiment only part of the spectrum of the pump light is sufficiently close to the peak to allow the generated solitons to utilize the effect of the decreasing dispersion between the peak and the minimum, i.e. that for some wavelength intervals an increase in the term $T_R^4/|\beta_2|^3$ compensates for the decrease in $E_s^4/(MFD^8\lambda^4)$ as discussed above. In one embodiment the part (or all) of the pump light which utilizes the effect of the decreasing dispersion between the peak and the minimum is referred to as the preferred pump wavelengths. Other parts of the pump light may for example be too close to the ZDW to achieve red-shifting past the peak, or be too close to the ZDW or minimum to take advantage of the compression of the decreasing dispersion. In one embodiment the wavelength of the preferred pump wavelengths are defined as the power weighted average wavelength of the preferred wavelengths in another embodiment the wavelength of the preferred pump wavelengths are defined as any wavelength in or all wavelengths in the preferred pump wavelengths.

The term "output comprising infrared wavelengths" is taken to mean a supercontinuum where at least some of the light within its broad spectrum has a wavelength longer than 1000 nm, such as longer than 1.5 µm, such as longer than 2 µm, such as longer than 2 µm, such as longer than 3 µm, such as longer than 4 µm, such as longer than 4.5 µm, such as longer than 5 µm, such as longer than 6 µm, such as longer than 8 µm nm, such as longer than 10 µm.

In one embodiment the nonlinear fiber has a dispersion profile similar to the solid curve in FIG. 1a. In this embodiment the peak wavelength is at approx. 2.1 µm, ZDW is at about 1.6 µm and the minimum is at about 3.3 µm.

As the pump light at preferred wavelengths enters the nonlinear fiber, the fiber nonlinearity and anomalous dispersion will cause it to break up temporally or to adapt its pulse length so that it forms fundamental soliton (N=1) pulses. This process is known as modulation instability or soliton fission depending on nonlinear fiber and pump light characteristics.

The energy of the solitons created during the break up will here be estimated as:

$$E_{S,M1} = \frac{P_0}{v_{max}} = \sqrt{\frac{P_0^2}{\frac{1}{4\pi^2}\frac{2\gamma P_0}{|\beta_2|}}} = \sqrt{\frac{2\pi^2|\beta_2|P_0}{\gamma}} = \sqrt{\frac{\pi^2|\beta_2|P_0 MFD^2\lambda}{4n_2}} \quad \text{Eq. 3}$$

Where $P_0$ is the peak power of the pump light at the preferred wavelengths and $V_{max}$ is the frequency shift for the gain peak of the modulation instability. The same method based on the assumption that the break-up mechanism is modulation instability is further explained in J. C. Travers, "Controlling nonlinear optics with dispersion in photonic crystal fibers", PhD Thesis, Imperial College London, (2008). In one embodiment a pulsed pump source is used and soliton fission is assumed and the soliton energies may be estimated as $$E_{S,fission} = \frac{|\beta_2|(4N_{Ppump} - 2)}{\gamma T_{Pump}} =$$

$$\sqrt{\frac{2|\beta_2|P_0}{\gamma} - \frac{2|\beta_2|}{\gamma T_{Pump}}} = \sqrt{\frac{|\beta_2|P_0 A_{eff}\lambda}{\pi n_2} - \frac{|\beta_2|A_{eff}\lambda}{\pi n_2 T_{Pump}}} \quad \text{Eq. 4}$$

Where $N_{pump}$ is the soliton number of the pump pulse as calculated by Eq. 1 and $T_{Pump}$ is the temporal pulse length of the pump pulse. In one embodiment soliton energy is calculated according to Eq. 4 for pulsed pump sources for whose pulses have $N_{Pump} < 17$ while Eq. 3 is used to estimate the soliton energy otherwise. For more on soliton fission and supercontinuum generation see e.g. Rev. Mod. Phys., Vol. 78, No. 4, p. 1135 (2006). This article also explains how, depending on the pump and fiber configuration, a supercontinuum may be generated with different pulsed lasers emitting pulse durations anywhere from femtoseconds up to continuous wave operation.

In one embodiment there can, subsequently to the break-up which creates solitons with this energy, be a large number of soliton collisions which preferentially transfer energy to the more powerful soliton talking part in a collision. Thereby solitons with significantly more power can be created in one embodiment. Such more powerful solitons would in one embodiment generally red-shift further than the ones created in the initial break-up but for simplicity only the solitons created in the initial break-up will be considered here. In one embodiment this explains why the simple model used to consider supercontinuum here generally significantly underestimates the width of the created supercontinuum because it underestimates the energy of the solitons involved in the processes. However, regardless of their exact power, the created solitons will in one embodiment red-shift according to the mechanics discussed below except that the extent of the generated spectrum into the long wavelengths may deviate somewhat from the predicted values. In one embodiment the rules disclosed for the preferred shape of the dispersion profile will therefore be valid, even if the exact energy of the solitons is different from the estimate used here.

Due to the Raman shifting discussed above, the solitons generated in the breakup will subsequently gradually red-shift as they propagate along the fiber thus pushing their centre wavelength toward longer wavelengths. Typically, the solitons propagate adiabatically while this change takes place, meaning that the solitons gradually adapt their shape to the fiber characteristics at the new wavelength without deviating significantly from the fundamental soliton shape. In one embodiment the solitons red-shift to longer wavelengths and encounter a decreasing dispersion on the long wavelength side of the peak of the dispersion curve. When the dispersion is decreasing, the solitons will in one embodiment adiabatically adapt to the new fiber characteristics by shortening their temporal pulse length. The shortening of the pulse length will in one embodiment cause the soliton to red-shift faster due to an increased peak power, thus encountering an even lower dispersion, which causes further shortening of the pulse length, accelerating the red-shift further.

In one embodiment this accelerating red-shift will continue until the soliton reaches the minimum of the dispersion profile at longer wavelengths, after which the red-shift will gradually decelerate and the soliton will if the fiber is long enough asymptotically approach a final wavelength given by the fiber and solitons characteristics. In one embodiment, this final wavelength will be longer than the minimum of the dispersion profile.

In order to further illustrate the behaviour of the solutions a moment method similar to the one implemented in "Soliton dynamics in non-uniform fiber tapers: analytical description through an improved moment method" by Z. Chen et al. (Journal of the Optical Society of America B, vol. 27, Issue 5, pp. 1022-1030 (2010)) was used to simulate the behaviours of the solitons in one embodiment. This behaviour has been plotted in FIG. 2. The centre wavelength (FIG. 2.*a*. solid line) of a soliton as it propagates along the nonlinear fiber will initially increase relatively slowly as it propagates along the fiber (rightward along the x-axis in FIG. 2), however, after it shifts above the top of the dispersion curve (in this embodiment at approx 2.1 µm) the red-shift accelerates until it attains its fastest speed around the minimum of the dispersion profile (in this embodiment at approx 3.3 µm) the red-shift then decelerates and in this embodiment it almost stabilizes at a wavelength of approx 3.6 µm. In one embodiment the energy of the soliton (FIG. 2.*b*.) gradually decreases mainly due to the photon energy loss inherent in the Raman process causing the wavelength shift but in one embodiment also due to fiber losses. In one embodiment this energy loss is gradual except where the red-shift is rapid which in this embodiment is at a nonlinear fiber length of approx 4.5 m as the soliton red-shift past the dispersion minimum at a wavelength of approx. 3.3 µm. The temporal pulse length (FIG. 2.*c*.) is closely connected to the soliton energy, the fiber nonlinearity and the dispersion as the soliton adiabatically adapts its shape to remain a fundamental soliton. Initially the soliton pulse length increases, but as the shortening caused by the decrease in the dispersion becomes stronger than the lengthening caused by the decrease in energy and the increase in MFD the soliton pulse length starts to contract. The pulse length then decreases until it red-shifts past the minimum of the dispersion curve (in this embodiment at a fiber length of approx 4.5 m). When it has passed the minimum increasing dispersion, decreasing energy, and increasing MFD, combine to rapidly increase its temporal length as it continues its red-shift. The peak power of the soliton (FIG. 2.*d*) will also change dramatically in a manner inverse to the pulse length. The peak power in this embodiment is thus generally decreasing, but rises to a sharp peak when the pulse length reaches its minimum at the point when the soliton is red-shifting past the minimum in the dispersion profile.

According to this explanation one object of the present invention is to provide a nonlinear fiber where a decrease in dispersion with increasing wavelength will be responsible for accelerating the soliton red-shift. In order for it to be possible to significantly reduce the dispersion relative to the value at the preferred pump wavelength it is in one embodiment desirable to initially pump at a wavelength where the dispersion is relatively large; therefore it is in one embodiment preferable to pump the fiber near the peak of the dispersion profile. In one embodiment the term "near" is taken to mean at wavelengths no more than 200 nm from the peak, such as no more than 150 nm from the peak, such as no more than 100 nm from the peak, such as no more than 150 nm from the peak, such as no more than 100 nm from the peak, such as no more than 75 nm from the peak, such as no more than 50 nm from the peak, such as no more than 15 nm from the peak, such as no more than 10 nm from the peak.

According to Eq. 3 the energy of the solitons generated in the initial breakup is dependent on the pump peak power in the preferred wavelengths and since the energy affects the rate of the red-shift of the soliton, the final wavelength that a soliton may reach is affected by the pump power in the preferred wavelengths. In one embodiment the dispersion and nonlinearity of the fiber at the preferred pump wavelengths affect the soliton energy, and the final wavelength achieved will in this embodiment also be affected by the wavelength of the pump. For one embodiment this relationship has been investigated (see FIG. 3) and compared to the results from a second fiber which does not have a wavelength interval where the dispersion decreases with increasing wavelength. The second fiber will in the following be called a positive gradient fiber since its dispersion plotted as a function of wavelength does not have a negative gradient for any wavelength in the interval investigated here. It was found that in the range tested the solitons would always red-shift at least as far or further in the fiber with the dispersion minimum, which represents one embodiment of the invention, than they would in the positive gradient fiber. It was also found that for a fiber representing one embodiment of the invention any pump peak power above a certain level would have a wavelength threshold where an increase in pump peak power or pump wavelength within the preferred pump wavelengths would lead to a large increase in the final soliton wavelength achieved at the end of the fiber (see FIG. 14). This threshold represents the combination of pump wavelength and pump peak power which will generate a soliton which could red-shift to a point on the dispersion curve where the subsequent decrease in dispersion with wavelength will ensure that the red-shift can continue, and ensure that solitons generated from pump powers above this threshold reaches a final wavelength above the dispersion minimum.

According to Eq. 2 the red-shift of a red-shifting soliton will normally slow down as it loses energy and shifts to longer wavelengths where the effective mode field diameter is larger, however, in one embodiment, a decrease in the dispersion in a nonlinear fiber at longer wavelengths can be used to compensate this in a wavelength interval in order to prevent a slow-down or even to accelerate the red-shift of the soliton. Thus in one embodiment the decrease in dispersion at longer wavelengths relative to the pump ensures an efficient red-shift. Accordingly the supercontinuum source Is arranged so that for a range of wavelengths longer than the preferred pump wavelengths the dispersion, D, is lower than at the pump wavelengths.

The acceleration of the red-shift of the solitons may in some embodiments be stronger when the difference between the dispersion at the preferred pump wavelengths and the dispersion at the minimum wavelength of the dispersion curve is larger such as when the minimum value of the dispersion is less than at the preferred pump wavelengths minus 1 ps/(nm km) or more, such as minus 2.5 ps/(nm km) or more, such as minus 5 ps/(nm km) or more, such as minus 7.5 ps/(nm km) or more, such as minus 10 ps/(nm km) or more, such as minus 15 ps/(nm km) or more, such as minus 20 ps/(nm km) or more, such as minus 30 ps/(nm km) or more, such as minus 50 ps/(nm km) or more, such as minus 75 ps/(nm km) or more, such as minus 100 ps/(nm km) or more, such as minus 150 ps/(nm km) or more, such as minus 200 ps/(nm km) or more.

In one embodiment the lower dispersion at wavelengths longer than the pump wavelengths will lead to solitons red-shifting faster past the wavelengths with reduced dispersion. One object of an embodiment of this invention is to generate light at long wavelengths, and accordingly it may be beneficial that the range of wavelengths with lower dispersion is wide, so that the soliton red-shift is accelerated over a wide wavelength range such as when the range of wavelengths is more than 25 nm, such as more than 100 nm, such as more than 250 nm, such as more than 300 nm, such as more than 500 nm, such as more than 750 nm, such as more than 1000 nm, such as more than 1250 nm, such as more than 1500 nm, such as more than 2000 nm, such as more than 2500 nm, such as more than 3000 nm, such as more than 4000 nm, such as more than 5000 nm. However, in order to ensure that the solitons can red-shift past the wavelength range with reduced dispersion, it may also be advantageous if the range is not too wide such as when the wavelength range is less than 10 µm, such as less than 5 µm, such as less than 4 µm, such as less than 3 µm, such as less than 2 µm, such as less than 1.5 µm, such as less than 1 µm, such as less than 0.75 µm, such as less than 0.5 µm, such as less than 0.25 µm. It some embodiments it can also be advantageous to have an increasing dispersion at some longer wavelengths in order to stop the red-shift of the solitons at a certain wavelength. This would require a limited width of the range of wavelengths with reduced dispersion.

In some embodiments, the pump may have a wide spectrum or have a spectrum which comprises peaks which are widely separated in wavelength; in that case a significant part of the energy in the pump light may be at wavelengths outside the preferred pump wavelengths. Accordingly, the preferred pump wavelengths may in one embodiment comprise more than 5% of the total optical power in the pump light, such as more than 10% of the total power, such as more than 15% of the total power, such as more than 20% of the total power, such as more than 25% of the total power, such as more than 30% of the total power, such as more than 35% of the total power, such as more than 40% of the total power, such as more than 45% of the total power, such as more than 50% of the total power, such as more than 55% of the total power, such as more than 60% of the total power, such as more than 65% of the total power, such as more than 70% of the total power, such as more than 75% of the total power, such as more than 80% of the total power, such as more than 85% of the total power, such as more than 90% of the total power, such as more than 95% of the total power, such as 100% of the total optical power.

In one embodiment the preferred pump wavelengths may be considered as the pump light at wavelengths longer than the wavelength of the peak of the dispersion curve.

In one embodiment it is advantageous to pump at wavelengths close to the peak of the dispersion curve in order to be able to benefit from the largest possible reduction in dispersion or steepest possible negative gradient of the dispersion when the solitons from the pump red-shift toward longer wavelengths. Accordingly in one embodiment, the preferred pump wavelengths are longer than the peak wavelength minus 400 nm or less, such as minus 300 nm or less, such as minus 200 nm or less, such as minus 100 nm or less, such as minus 75 nm or less, such as minus 50 nm or less, such as minus 25 nm or less, such as minus 15 nm or less, such as longer than the peak wavelength, such as longer than the peak wavelength plus 15 nm, such as longer than the peak wavelength plus 25 nm, such as longer than the peak wavelength plus 50 nm, such as longer than the peak wavelength plus 100 nm, such as longer than the peak wavelength plus 200 nm, such as longer than the peak wavelength plus 300 nm.

In one embodiment, the object of this invention is to most efficiently generate a supercontinuum reaching the longest wavelengths possible. In order to do this it can be advantageous to start with a pump with a long wavelength such as when the preferred pump wavelengths are longer than 1.6 microns, such as longer than 1800 nm, such as longer than 1900 nm, such as longer than 2000 nm, such as longer than 2100 nm, such as longer than 2400 nm, such as longer than 3000 nm, such as longer than 4000 nm, or such as longer than 5000 nm.

In order for the decreasing dispersion at longer wavelengths to be able to accelerate the red-shift it is necessary for the red-shifting solitons to have a certain soliton energy, and in order to generate solitons with higher energy it may be beneficial to pump at a wavelength where the dispersion has a positive value significantly different from zero. Accordingly in one embodiment a significant part of the energy in the pump light entering the nonlinear fiber is at wavelengths at least 50 nm or longer than the ZDW, a significant part being 5% or more, such as 10% or more, such as 20% or more, such as 30% or more, such as 40% or more, such as 50% or more, such as 60% or more, such as 70% or more, such as 80% or more, such as 90% or more of the pump energy. In one embodiment this may mean that a significant part of the energy in the pump light entering the nonlinear fiber is at wavelengths at least 100 nm or longer than the ZDW, a significant part being 5% or more, such as 10% or more, such as 20% or more, such as 30% or more, such as 40% or more, such as 50% or more, such as 60% or more, such as 70% or more, such as 80% or more, such as 90% or more of the pump energy. In one embodiment, this may also mean that a significant part of the energy in the pump light entering the nonlinear fiber is at wavelengths at least 200 nm or longer than the ZDW, a significant part being 5% or more, such as 10% or more, such as 20% or more, such as 30% or more, such as 40% or more, such as 50% or more, such as 60% or more, such as 70% or more, such as 80% or more, such as 90% or more of the pump energy.

In one embodiment the red-shift of solitons formed at the pump wavelength is accelerated by a decrease in the dispersion at longer wavelengths. In order for the dispersion to be decreased over a wide range of wavelengths it may be beneficial to pump at wavelengths near the peak of the dispersion profile or longer. In an embodiment where the pump is at a relatively long wavelength it may thus be advantageous if the peak of the dispersion wavelength is also at a relatively long wavelength. Accordingly, in one embodiment the peak wavelength is longer than 1.5 µm and shorter than 1.8 µm, or is longer than 1.8 µm and shorter than 2.1 µm, or is longer than 1.9 µm and shorter than 2.3 µm, or is longer than 2.0 µm and shorter than 2.6 µm, or is longer than 2.6 µm and shorter than 3 µm, or is longer than 3 µm and shorter than 3.5 µm, or is longer than 3.5 µm and shorter than 4 µm, or is longer than 4 µm and shorter than 5 µm, or is longer than 5 µm and shorter than 8 µm, or is longer than 8 µm and shorter than 24 µm.

In some embodiments the height of the peak and distance between the peak and the ZDW may vary depending on the material dispersion, and the fiber geometry and the peak may in some embodiments be far from the ZDW. Accordingly, in one embodiment the peak wavelength is 50 nm or more longer than the ZDW, such as 100 nm longer or more, such as 150 nm longer or more, such as 200 nm longer or more, such as 300 nm longer or more, such as 400 nm longer or more, such as 500 nm longer or more, such as 750 nm longer or more, such as 1 µm longer or more, such as 2 µm longer or more.

If the dispersion is positive (anomalous) the red-shift of solitons is normally relatively rapid at wavelengths close to the pump wavelength where the solitons have not yet lost much energy to due to the photon energy loss inherent in the Raman process, and where the wavelength and efficient mode field diameter has not increased much relative to the value at which the soliton was first formed or to which it adapted its shape when the pump light entered the nonlinear fiber. In one embodiment, it is advantageous if the minimum in the dispersion profile is located at a relatively long wavelength so that the wavelength range where the soliton red-shift is most accelerated is at the wavelengths where it is most necessary to accelerate it in order to overcome the effect of the increasing mode field diameter and decreasing energy which would otherwise slow down the red-shift.

Accordingly, in one embodiment the minimum wavelength is longer than 1.5 µm, such as longer than 2 µm, such as longer than 2.5 µm, such as longer than 3 µm, such as longer than 3.25 µm, such as longer than 3.5 µm, such as longer than 3.75 µm, such as longer than 4 µm, such as longer than 4.25 µm, such as longer than 4.5 µm, such as longer than 4.75 µm, such as longer than 5 µm, such as longer than 5.25 µm, such as longer than 5.5 µm, such as longer than 6 µm, such as longer than 8 µm, such as longer than 10 µm, such as longer than 12 µm, or such as longer than 24 µm.

As may be derived from Eq. 2 the red-shift rate may in one embodiment be proportional to the inverse of the absolute value of the dispersion. It may therefore be advantageous if the absolute value of the dispersion at the minimum is low so that solitons may red-shift rapidly past the minimum and the wavelength range surrounding the minimum. Accordingly, in one embodiment the absolute value of the dispersion of the nonlinear fiber at the minimum wavelength is 10 ps/(nm km) or less, such as 5 ps/(nm km) or less, such as 3 ps/(nm km) or less, such as 2 ps/(nm km) or less, such as 1 ps/(nm km) or less, such as 0.5 ps/(nm km) or less, such as 0.1 ps/(nm km) or less, such as 0.05 ps/(nm km) or less, such as 0.01 ps/(nm km) or less.

In some embodiments it may be advantageous to define the dispersion at the range of longer wavelengths as being lower than at the dispersion at the peak. This range of wavelengths with lower dispersion may accelerate the red-shift of the solitons and/or allow other advantageous non-linear processes. Accordingly in one embodiment D is in at least part of the range of wavelengths at least 1 ps/(nm km) lower than at the peak wavelength, such as at least 2.5 ps/(nm km) lower, such as at least 5 ps/(nm km) lower, such as at least 7.5 ps/(nm km) lower, such as at least 10 ps/(nm km), such as at least 15 ps/(nm km) lower, such as at least 20 ps/(nm km) lower, such as at least 30 ps/(nm km) lower, such as at least 50 ps/(nm km) lower, such as at least 75 ps/(nm km) lower, such as at least 100 ps/(nm km) lower, such as at least 150 ps/(nm km) lower, such as at least 200 ps/(nm km) lower than at the peak.

In one embodiment the minimum value of the dispersion, D, is less than the dispersion at the peak, and the absolute value of the dispersion at the minimum is less than 2 times the dispersion at the peak, such as less than 1.5 times the peak value, such as less than the peak value, such as less than 0.5 times the peak value, such as less than 0.25 times the peak value, such as less than 0.1 times the peak value, such as less than 0.05 times the peak value, such as less than 0.01 times the peak value, such as less than 0.005 times the peak value, such as less than 0.001 times the peak value, such as less than 0.0005 times the peak value, such as less than 0.0001 times the peak value. In one embodiment, this is advantageous because the acceleration of the soliton red-shift does not so much rely on the numerical value of the reduction in the dispersion as it relies on the dispersion at longer wavelengths being relatively smaller than at the shorter wavelengths were the solitons were first formed.

In one embodiment, the dispersion will be negative (normal) at the minimum of the dispersion profile. In this case there will be a second zero dispersion wavelength (ZDW-2) between the peak and the minimum of the dispersion curve and a third zero dispersion wavelength (ZDW-3) at a wavelength longer than the minimum of the dispersion curve. One possible example of this can be seen in FIG. 6. With such a dispersion profile there may be phase match between solitons in the anomalous region shorter than ZDW-2 to wavelength in the region with negative (normal) dispersion between ZDW-2 and ZDW-3, so that dispersive waves are generated in this normal dispersive region. For more on the theory of phase matching and dispersive wave generation in the context for supercontinuum generation see e.g. Rev. Mod. Phys., Vol. 78, No. 4, p. 1135 (2006). In one embodiment, the region with negative (normal) dispersion is relatively narrow and then the solitons at wavelengths shorter than ZDW-2 may phase match to wavelengths longer than ZDW-3. This can provide gain for those wavelengths longer than ZDW-3 and thus transfer energy past the region of normal dispersion. Accordingly, in one embodiment the dispersion is negative (normal) at the minimum wavelength. In addition, in one embodiment the dispersion is negative at some wavelengths longer than the peak wavelength over a range wider than 10 nm, such as wider than 40 nm, such as wider than 100 nm, such as wider than 200 nm, such as wider than 300 nm, such as wider than 400 nm, such as wider than 500 nm, such as wider than 750 nm and/or over a range narrower than 1000 nm, such as narrower than 750 nm, such as narrower than 500 nm, such as narrower than 400 nm, such as narrower than 300 nm, such as narrower than 200 nm, such as narrower than 100 nm, such as narrower than 40 nm such as over a range wider than 10 nm and narrower than 40 nm, or wider than 40 nm and narrower than 100 nm, or wider than 100 nm and narrower than 200 nm, or wider than 200 nm and narrower than 300 nm, or wider than 300 nm and narrower than 400 nm, or wider than 400 nm and narrower than 500 nm, or wider than 500 nm and narrower than 750 nm, or wider than 750 nm and narrower than 1000 nm.

In one embodiment, the object of the invention is to generate a supercontinuum that reaches wavelengths significantly longer than the transparency window of silica. Accordingly, in one embodiment, the nonlinear fiber is transparent at a wavelength longer than 2.5 µm, such as longer than 3 µm, such as longer than 3.5 µm, such as longer than 4 µm, such as longer than 4.5 µm, such as longer than 5 μm, such as longer than 6 μm, such as longer than 7 μm, such as longer than 8 μm, such as longer than 10 μm, such as longer than 12 μm, or such as longer than 24 μm. In this context a glass may be said to be transparent at a certain wavelength if the absorption loss for light propagating through the glass is less than 50 dB/m at the wavelength.

One type of fiber which is often relatively simple to produce is a step index fiber, and in one embodiment the non-linear fiber of the supercontinuum source is a step-index fiber.

Silica is the glass material most commonly used for fiber optics, but silica has high absorption losses for wavelengths longer than approx. 2.5 μm. In an embodiment where the object of the invention is to generate wavelengths longer than 2.5 μm, it may thus be advantageous to use a fiber whose core is made from another glass material which is transparent at longer wavelengths than silica glass. One group of glasses which can be transparent to longer wavelengths is the soft glasses, including fluoride glasses, telluride glasses and chalcogenide glasses. Accordingly, in one embodiment the non-linear fiber comprises a core arranged to guide the pump light the core comprising a soft glass such as a fluoride glass, a ZBLAN glass, an InF based glass, a halide glass, a telluride glass, a Chalcogenide glass, an AsS glass, an AsSe glass, an AsSeTe, or any mixture or combination thereof. In this context, a soft glass may be defined as a glass whose melting point is considerably lower than the melting point of silica, such as a glass whose melting point is less than 1500 degrees Celsius, such as less than 1250 degrees Celsius, such as less than 1000 degrees Celsius, such as less than 750 degrees Celsius, such as less than 500 degrees Celsius, such as less than 400 degrees Celsius, such as less than 375 degrees Celsius, such as less than 350 degrees Celsius, such as less than 325 degrees Celsius, such as less than 300 degrees Celsius, such as less than 275 degrees Celsius, such as less than 250 degrees Celsius, such as less than 200 degrees Celsius.

For fibers, it is generally possible to define an absorption edge at longer wavelengths where absorption becomes strong enough to limit the ability of light at those wavelengths to propagate along the fiber. In the context of the present application, the absorption edge is the wavelength where the absorption increases to more than some certain value divided by the length of the nonlinear fiber used in the supercontinuum source, such as 5 dB divided by the length of the nonlinear fiber, such as 10 dB divided by the length of the nonlinear fiber, such as 25 dB divided by the length of the nonlinear fiber, such as 50 dB divided with the length of the nonlinear fiber, such as 100 dB divided by the length of the nonlinear fiber. Thus in an embodiment where the absorption edge is the wavelength where the absorption increases to more than 10 dB divided by the length of the nonlinear fiber is used with a 10 m nonlinear fiber in the light source the loss edge will be the wavelength where the loss becomes more than 1 dB/m, if only 1 m of nonlinear fiber is used in the light source the loss edge will be the wavelength where the loss increases above 10 dB/m etc. For the generation of infrared supercontinuum it is common to use a nonlinear fiber composed from soft glass and the nonlinear refractive index of such glasses may differ by more than a factor 1000 depending on glass type. It is thus possible depending on fiber and pump light characteristics that the nonlinear fiber in one embodiment may have a length of hundreds of meters or more, while in another embodiment the length may be a few centimetres or less.

In order to minimize the power which is lost in the nonlinear fiber it may in one embodiment be advantageous to reduce the amount of light that is generated at wavelengths longer than the absorption edge of the fiber. Light at wavelengths longer than the absorption edge will experience a significant absorption loss in the fiber, and this loss will reduce the total output power possible. A significant absorption of light may also be harmful to the nonlinear fiber as the heating associated with such absorption of energy may cause changes in the fiber material. The final wavelength of the solitons may be strongly affected by the wavelength of the minimum of the dispersion profile. Thus, the wavelength of the minimum may to some degree be used to control how much light there will be at wavelengths longer than the absorption edge. Accordingly, in one embodiment the non-linear fiber comprises an absorption edge at a wavelength longer than the minimum wavelength wherein the minimum wavelength is shorter than the absorption edge wavelength minus 25 nm or more, such as minus 50 nm or more, such as minus 100 nm or more, such as minus 200 nm or more, such as minus 400 nm or more, such as minus 600 nm or more, such as minus 800 nm or more, such as minus 1 μm or more, such as minus 2 μm or more, such as minus 4 μm or more.

Aside from the position of the minimum of the dispersion profile, a second zero dispersion wavelength ZDW-2 may be used to limit the amount of energy above the absorption edge. When solitons red-shift towards a (ZDW-2) they may phase match with wavelengths above this ZDW-2 and generate dispersive waves at these phase matched wavelengths. In one embodiment, the generation of such dispersive waves creates a push toward shorter wavelengths on the soliton. This push may in one embodiment reduce, stop or even reverse the red-shift of the soliton, thus preventing the soliton from red-shifting past the ZDW-2. Due to this, the soliton will in one embodiment eventually stabilize its wavelength at some wavelength shorter than ZDW-2, while it generates dispersive waves above ZDW-2. Thus the existence and position of a ZDW-2 can have a strong effect on the long wavelength edge of a supercontinuum and can thus be use to prevent the supercontinuum from reaching wavelengths with strong absorption. Accordingly, in one embodiment the nonlinear fiber comprises an absorption edge wavelength at a wavelength longer than the peak wavelength, and the non-linear fiber comprises a second zero dispersion wavelength (ZDW-2) at a wavelength longer than the peak wavelength and shorter than the absorption edge wavelength minus 25 nm or more, such as minus 50 nm or more, such as minus 100 nm or more, such as minus 200 nm or more, such as minus 400 nm or more, such as minus 600 nm or more, such as minus 800 nm or more, such as minus 1 μm or more.

As explained in the above, the dispersion profile of the fiber may in one embodiment accelerate the red-shift of solitons so that they red-shift to wavelengths longer than the minimum of the dispersion profile. In another embodiment, the minimum of the dispersion profile will have negative (normal) dispersion and the solitons may then generate dispersive waves above the ZDW-2 some of which may be at wavelengths longer than the minimum. Light above the ZDW-3 may also be generated in this case. Accordingly, in one embodiment the pump light and nonlinear fiber are arranged so that the supercontinuum extends to wavelengths longer than the minimum wavelength, such as to the minimum wavelength plus 50 nm or more, such as plus 100 nm or more, such as plus 150 nm or more, such as plus 200 nm or more, such as plus 400 nm or more, such as plus 500 nm or more, such as plus 750 nm or more, such as plus 1 μm or more, such as plus 2 μm or more.

In an embodiment the supercontinuum source will be pumped by a fiber laser, a fiber master oscillator power amplifier (MOPA) or a diode laser which has been amplified in a fiber amplifier, however it should be obvious to one skilled in the art that even when these pump sources are substituted by other lasers the optimized fiber profiles disclosed here may still be advantageous towards controlling supercontinuum generation. Accordingly, in one embodiment the pump source is selected from the group of lasers consisting of, but not limited to: mode locked lasers, q-switch lasers, continuous wave (CW) lasers, modulated CW lasers, gain switched lasers, chip lasers, fiber lasers, light emitting diode (LED) lasers, gas lasers, ceramic lasers, chemical lasers, dye lasers, photonic crystal lasers, semiconductor lasers, excimer lasers, diode pumped solid state (DPSS) lasers, frequency doubled or tripled lasers and Raman lasers or another supercontinuum source. In one embodiment, the pump source may be a pulsed laser emitting pulses with a duration shorter than 10 ms such as shorter than 1 ms, such as shorter than 100 ns, such as shorter than 10 ns, such as shorter than 6 ns, such as shorter than 5 ns, such as shorter than 4 ns, such as shorter than 3 ns, such as shorter than 2.5 ns, such as shorter than 2 ns, such as shorter than 1.5 ns, such as shorter than 1 ns, such as shorter than 750 ps, such as shorter than 600 ps, such as shorter than 500 ps, such as shorter than 400 ps, such as shorter than 300 ps, such as shorter than 200 ps, such as shorter than 100 ps, such as shorter than 75 ps, such as shorter than 50 ps, such as shorter than 40 ps, such as shorter than 30 ps, such as shorter than 20 ps, such as shorter than 10 ps, such as shorter than 7.5 ps, such as shorter than 5 ps, such as shorter than 2.5 ps, such as shorter than 2 ps, such as shorter than 1.5 ps, such as shorter than 1 ps, such as shorter than 1 ps, such as shorter than 0.8 ps, such as shorter than 0.6 ps, such as shorter than 0.4 ps, such as shorter than 0.2 ps, such as shorter than 0.1 ps and/or longer than 0.05 ps, such as longer than 0.1 ps, such as longer than 0.5 ps, such as longer than 0.75 ps, such as longer than 1 ps, such as longer than 2 ps, such as longer than 5 ps, such as longer than 10 ps, such as longer than 20 ps, such as longer than 50 ps, such as longer than 100 ps, such as longer than 0.2 ns, such as longer than 0.5 ns, such as longer than 0.75 ns, such as longer than 1 ns, such as longer than 2 ns, such as longer than 3 ns, such as longer than 5 ns, such as longer than 10 ns, such as longer than 20 ns, such as longer than 0.1 ms, such as longer than 1 ms, or such as longer than 100 fs but shorter than 1.5 ps, or such as longer than 250 fs but shorter than 5 ps, or such as longer than 0.5 ps but shorter than 10 ps, or such as longer than 5 ps but shorter than 100 ps, or such as longer than 0.1 ns but shorter than 1 ns, or such as longer than 0.5 ns but shorter than 3 ns, or such as longer than 1 ns but shorter than 5 ns, or such as longer than 3 ns but shorter than 1 ms, or such as longer than 10 ns but shorter than 1 ns. In one embodiment the peak power of the pump source may be less than 10 MW, such as less than 5 MW, such as less than 1 MW, such as less than 750 kW, such as less than 500 kW, such as less than 250 kW, such as less than 200 kW, such as less than 150 kW, such as less than 100 kW, such as less than 75 kW, such as less than 50 kW, such as less than 25 kW, such as less than 15 kW, such as less than 10 kW, such as less than 7.5 kW, such as less than 5 kW, such as less than 4 kW, such as less than 3 kW, such as less than 2 kW, such as less than 1.5 kW, such as less than 1 kW, such as less than 0.5 kW, such as less than 0.25 kW, such as less than 0.1 kW, such as less than 50 W, such as less than 25 W, such as less than 10 W, such as less than 5 W, such as less than 2 W, such as less than 1 W, such as less than 0.5 W, such as less than 0.25 W, such as less than 0.1 W and/or more than 0.05 W, such as more than 0.1 W, such as more than 0.25 W, such as more than 0.5 W, such as more than 1 W, such as more than 2 W, such as more than 5 W, such as more than 10 W, such as more than 25 W, such as more than 50 W, such as more than 0.1 kW, such as more than 0.25 kW, such as more than 0.5 kW, such as more than 0.75 W, such as more than 1 kW, such as more than 2.5 kW, such as more than 5 kW, such as more than 10 kW, such as more than 25 kW, such as more than 50 kW, such as more than 75 kW, such as more than 0.1 MW, such as more than 0.15 MW, such as more than 0.25 MW, such as more than 0.5 MW, such as more than 0.75 MW, such as more than 1 MW, or such as between 0.5 kW and 5 kW, or such as between 0.5 kW and 10 kW, or such as between 5 kW and 20 kW, or such as between 10 kW and 50 kW, or such as between 25 kW and 75 kW, or such as between 40 kW and 150 kW. In one embodiment the supercontinuum source may also be used to pump another longer wavelength supercontinuum source.

In an embodiment the light source is arranged to emit a supercontinuum in the near to mid infrared spectrum. Accordingly, the majority of the output energy in the generated supercontinuum is emitted at wavelengths longer than 1000 nm, such as longer than 1300 nm, such as longer than 1500 nm, such as longer than 1800 nm, such as longer than 2000 nm, such as longer than 3000 nm, such as longer than 4000 nm and/or shorter than 12 µm, such as shorter than 10 µm, such as shorter than 8 µm, such as shorter than 6 µm, such as shorter than 5.5 µm, such as shorter than 5 µm, such as shorter than 4.5 µm, such as shorter than 4 µm, such as between 1800 nm and 5000 nm, such as between 1800 nm and 4500 nm, such as between 1500 nm and 4500 nm, such as between 1800 nm and 4000 nm, such as between 1800 nm and 5500 nm.

Since the dispersion is an important parameter in determining the soliton energy and the red-shift rate, the value of the dispersion at the peak affects the wavelength that solitons may reach at the end of the nonlinear fiber. Dispersion profiles representing embodiments of the invention, but with different peak heights are shown in FIG. 4, and in FIG. 5 is shown the soliton wavelengths that are reached at the end of a 10 m section of these nonlinear fibers in moment method simulations for different pump wavelengths and two different pump powers. As the height of the peak is increased, the pump wavelength and/or pump peak power necessary to reach the threshold where solitons may red-shift beyond the dispersion minimum increases, as the dispersion at the pump wavelength and the distance to the minimum increases (see FIG. 14 for explanation of the threshold). However, a higher peak may also shift the minimum in the dispersion profile to longer wavelengths so that pumping above the threshold can generate solitons which reach longer wavelengths. In one embodiment, a higher numerical aperture produces a higher peak in the dispersion profile. In one embodiment the nonlinear fiber has a numerical aperture of more than 0.25, such as a numerical aperture of more than 0.3, such as a numerical aperture of more than 0.325, such as a numerical aperture of more than 0.35, such as a numerical aperture of more than 0.375, such as a numerical aperture of more than 0.4, such as a numerical aperture of more than 0.45, such as a numerical aperture of more than 0.5, such as a numerical aperture of more than 0.6, such as a numerical aperture of more than 0.7, such as a numerical aperture of more than 0.8, such as a numerical aperture of more than 0.9. The numerical aperture NA is in one embodiment defined based on the refractive index difference between the core of the fiber and the surrounding material based on the relationship NA=

$\sqrt{n_{co}^2 - n_{cl}^2}$, where $n_{co}$ is the refractive index of the fiber core and $n_{cl}$ is the refractive index of the surrounding material.

In an embodiment the nonlinear fiber is made from ZBLAN ($ZrF_4$—$BaF_2$—$LaF_3$—$AlF_3$—$NaF$) fluoride glass. In FIG. 7 some fiber geometries relevant to this invention have been mapped out for one ZBLAN material composition; such a map can be made for other materials in order to identify fiber geometries which can accelerate the soliton red-shift. Different ZBLAN compositions may have different material dispersion, and consequently different fiber geometries may be necessary in order to produce the waveguide dispersion necessary to balance the material dispersion. However, one range of waveguide geometries which provide a nonlinear fiber suitable for the invention may be identified from FIG. 7. Accordingly, in one embodiment, the nonlinear fiber is a fluoride glass fiber with a core diameter smaller than 7 µm, such as smaller than 6.8 µm, such as smaller than 6.6 µm, such as smaller than 6.5 µm, such as smaller than 6.4 µm, such as smaller than 6.3 µm, such as smaller than 6.2 µm, such as smaller than 6.1 µm, such as smaller than 6 µm, such as smaller than 5.8 µm, such as smaller than 5.6 µm, such as smaller than 5.4 µm, such as smaller than 5 µm and larger than 4 µm, such as larger than 4.5 µm, such as larger than 4.75 µm, such as larger than 5 µm, such as larger than 5.1 µm, such as larger than 5.2 µm, such as larger than 5.3 µm, such as larger than 5.4 µm, such as larger than 5.5 µm, such as larger than 5.6 µm, such as larger than 5.7 µm, such as larger than 5.8 µm, such as larger than 5.9 µm, such as larger than 6 µm, such as larger than 6.2 µm, such as larger than 6.5 µm, such as between 4 µm and 6.8, such as between 4.5 µm and 6.5, such as between 5 µm and 6.2, such as between 5.5 µm and 6.2, such as between 5.75 µm and 6 µm and a numerical aperture of more than 0.26, such as a numerical aperture of more than 0.275, such as a numerical aperture of more than 0.29, such as a numerical aperture of more than 0.3, such as a numerical aperture of more than 0.325, such as a numerical aperture of more than 0.35, such as a numerical aperture of more than 0.375, such as a numerical aperture of more than 0.4, such as a numerical aperture of more than 0.425, such as a numerical aperture of more than 0.45, such as a numerical aperture of more than 0.475, such as a numerical aperture of more than 0.5, such as a numerical aperture of more than 0.55.

As laid out in FIG. 7, the invention relates in an embodiment to a supercontinuum light source comprising a pump light source arranged to emit pump light and a nonlinear fiber having a core arranged to receive the pump light where the pump light and nonlinear fiber are arranged so that a supercontinuum comprising infrared wavelengths is generated in the nonlinear fiber from the pump light, the nonlinear fiber having a dispersion profile, $D(\lambda)$, wherein the core comprises fluoride glass and has a core diameter smaller than 7 µm and the fiber being arranged to have a numerical aperture of more than 0.26. Accordingly, in one embodiment, the core diameter and numerical aperture is a combination of any of the numbers cited in the previous paragraph.

In one embodiment, the preferred fiber dispersion profile is critically dependent on the exact core diameter which n provides a dispersion at the minimum wavelength that is positive (anomalous) but close to zero. In one embodiment, it was found that if the core diameter was changed by 0.2 µm from a preferred geometry the beneficial effect of the optimized dispersion profile was reduced considerably, so that the final wavelength reached for solitons was reduced by 500 nm or more. However, when the preferred profile is used, FIG. 2 shows that the accelerated red-shift may lead to solitons reaching a much longer wavelength, and that the shift occurs in a short fiber length. Therefore, it is in one embodiment only necessary to have the preferred fiber profile over a short section of the fiber. In order to ensure or improve the likelihood that a section of fiber of a certain length from a draw will comprise at least one section where the dispersion profile is the preferred profile it may be beneficial to periodically modulate the core diameter along the draw. Accordingly, in one embodiment the core diameter of the nonlinear fiber is arranged to vary over the length of fiber used in the light source, the variation being less than 1 µm, but more than 0.5 µm or less than 0.5 µm, but more than 0.4 µm or less than 0.4 µm, but more than 0.3 µm or less than 0.3 µm, but more than 0.2 µm or less than 0.2 µm, but more than 0.1 µm or less than 0.1 µm, but more than 0.05 µm or less than 0.05 µm, but more than 0.025 µm or less than 0.025 µm, but more than 0.01 µm. In one embodiment, the length period of such a core diameter modulation should be similar to or shorter than the length of the nonlinear fiber used in the light source e.g. the period of the modulation may be shorter than twice the nonlinear fiber length, such as shorter than 1.5 times the nonlinear fiber length, such as shorter the nonlinear fiber length, such as shorter than 0.5 times the nonlinear fiber length, such as shorter than 0.25 times the nonlinear fiber length, such as shorter than 0.1 times the nonlinear fiber length, such as shorter than 0.05 times the nonlinear fiber length, such as shorter than 0.01 times the nonlinear fiber length.

In some applications it may be beneficial to be able to adjust the repetition rate of the pump system and thus supercontinuum source. In one embodiment such adjustment may be used to increase the average power while keeping the pulse energy constant, in the same way the adjustment could be used to increase the pulse energy while keeping average power constant, which may in turn affect the output spectrum. In one embodiment the adjustment might not be used in order to affect the pulse and or average power but may instead be used to fulfill some pulse timing requirement set by the application in which the supercontinuum source is used. Such a timing requirement could be, but is not limited to, applications where it is necessary to measure particularly when there either is or is not light from the supercontinuum source incident on a sample or the timing requirement could be set by the need to trigger other parts of a measurement or analysis system. In one embodiment the pulse repetition rate is increased by splitting off part of the pump light and selectively delaying either the original pulse or the pulse split off before combining the two pulses which are then delayed relatively to each other in the same fiber. This may be done any number of times in order to multiply the repetition rate by any number. In one embodiment the repetition rate is reduced by blocking some pulses with an acousto-optical modulator (AOM) or an electro optical modulator. Such reduction or multiplication of the repetition rate may be done either directly on a seed laser in the pump system, between or in any amplifier in the pump system of finally before or after the nonlinear fiber. Accordingly in one embodiment the pump system comprises a pulse picker and/or frequency multiplier which ensures that the repetition rate of the output supercontinuum is different from any one or more lasers in the pump system.

In one embodiment the object of the present invention is to generate a long wavelength supercontinuum and in order to do this it may be beneficial to use a nonlinear fiber whose core and possibly also cladding is made from a material which has a absorption edge at longer wavelengths. In an embodiment the nonlinear fiber is a fluoride fiber in which $InF_3$ is a principal component and having an absorption edge at a longer wavelength than one which does comprise $InF_3$. However, if the glass comprises too much $InF_3$, crystallization will occur leading to a glass unsuitable for the nonlinear fiber. Accordingly in one embodiment the invention relates to a supercontinuum source comprising a pump light source arranged to emit pump light and a nonlinear fiber having a core arranged to receive the pump light where the pump light and nonlinear fiber are arranged so that a supercontinuum comprising infrared wavelengths is generated in the nonlinear fiber from the pump light, the nonlinear fiber having a dispersion profile, $D(\lambda)$, wherein the core comprises fluoride glass and comprises InF in a concentration of less than 90 mol %, such as less than 85 mol %, such as less than 80 mol %, such as less than 75 mol %, such as less than 70 mol %, such as less than 65 mol %, such as less than 60 mol %, but more than 1 mol % InF, such as more than 5 mol %, such as more than 10 mol %, such as more than 20 mol %, such as more than 30 mol %, such as more than 40 mol %, such as more than 50 mol %, such as more than 60 mol %, such as more than 70 mol %, such as between 1 mol % and 55 mol %, such as between 5 mol % and 50 mol %, such as between 10 mol % and 45 mol %, such as between 15 mol % and 35 mol %. In one embodiment such a supercontinuum light source benefits from one or more of the features of the embodiments of supercontinuum light sources discussed throughout this text.

In a similar fashion it has been found that a fluoride glass such as ZBLAN that comprises $YF_3$ and/or $GaF_3$ possibly as a replacement for AlF3 may have an absorption edge at a relatively longer wavelength, however if the concentration are too high a glass suitable for optical fibers cannot be obtained. Accordingly in one embodiment the invention relates to a supercontinuum source comprising a pump light source arranged to emit pump light and a nonlinear fiber having a core arranged to receive the pump light where the pump light and nonlinear fiber are arranged so that a supercontinuum comprising infrared wavelengths is generated in the nonlinear fiber from the pump light, the nonlinear fiber having a dispersion profile, $D(\lambda)$, wherein the core comprises fluoride glass and comprises any of the compounds $YF_3$ or $GaF_3$ in a concentration of less than 40 mol %, such as less than 30 mol %, such as less than 20 mol %, but more than 0.1 mol %, such as more than 0.5 mol %, such as more than 1 mol %, such as more than 2 mol %, such as more than 2.5 mol %, such as more than 3 mol %, such as more than 3.5 mol %, such as more than 4 mol %, such as more than 4.5 mol %, such as more than 5 mol %, such as more than 7.5 mol %, such as more than 10 mol %, such as more than 12.5 mol %, such as more than 15 mol %, such as more than 17.5 mol %, such as more than 20 mol %, such as more than 22.5 mol %, such as more than 25 mol %, such as more than 27.5 mol %, such as more than 30 mol %. In one embodiment such a supercontinuum light source benefits from one or more of the features of the embodiments of supercontinuum light sources discussed throughout this text.

Often glass materials which comprises atoms bound to oxygen has strong absorption bands in the 2-5 µm wavelength range. This is detrimental to an embodiment of the invention which aims to generate light in this wavelength range and accordingly it may be advantageous to use fiber whose core and/or cladding material comprises no or few atoms bound to oxygen. Accordingly in one embodiment the core of the nonlinear fiber comprises has a composition with less than 20 mol % oxide molecules, such as less than 10 mol %, such as less than 5 mol %, such as less than 1 mol %, such as less than 0.1 mol %, such as less than 0.05 mol %, such as less than 0.01 mol %, such as less than 0.005 mol %, such as less than 0.001 mol %, such as less than 0.0001 mol %.

As noted above and as can be derived from FIG. 5 it may in one embodiment be advantageous to use a fiber with a large numerical aperture in order to push the minimum of the dispersion to a longer wavelength and consequently allow the solitons to red-shift to a longer wavelength. It has been found that one may increase the refractive index of a fluoride material without significantly altering its crystallization temperature by adding $PbF_2$ to the material composition. The numerical aperture of the core may thus be increased by selectively adding $PbF_2$ to the core material or by ensuring that the $PbF_2$ content in the core is higher than in the cladding. Accordingly in one embodiment the invention relates to supercontinuum source comprising a pump light source arranged to emit pump light and a nonlinear fiber having a core arranged to receive the pump light where the pump light and nonlinear fiber are arranged so that a supercontinuum comprising infrared wavelengths is generated in the nonlinear fiber from the pump light, the nonlinear fiber having a dispersion profile, $D(\lambda)$, wherein the core comprises fluoride glass and comprises $PbF_2$ in a concentration of less than 30 mol % but more than 1 mol %, such as more than 2.5 mol %, such as more than 5 mol %, such as more than 7.5 mol %, such as more than 10 mol %, such as more than 12.5 mol %, such as more than 15 mol %, such as more than 17.5 mol %, such as more than 20 mol %, such as more than 22.5 mol %, or such as more than 25 mol %. In one embodiment such a supercontinuum light source benefits from one or more of the features of the embodiments of supercontinuum light sources discussed throughout this text.

In one embodiment the invention relates to a short pulse light source. From FIG. 2 (c) it can be derived that one embodiment of the supercontinuum light source may be configured to produce short pulses by adjusting the fiber length and pump parameters so that a soliton will exit the fiber when it is approximately at the wavelength of the minimum of the dispersion curve. In this embodiment the main function of the decrease in dispersion may be to temporally compress the soliton to produce a short output pulse. Accordingly in one embodiment the output from the nonlinear fiber comprises one or more pulses per pump pulse whose temporal full width half maximum (FWHM) length is less than 250 fs, such as less than 100 fs, such as less than 75 fs, such as less than 50 fs, such as less than 25 fs, such as less than 20 fs, such as less than 15 fs, such as less than 10 fs, such as less than 5 fs, such as less than 1 fs, or where the output can be spectrally filtered and/or compressed to produce one or more such pulses. In one embodiment the invention relates to such a short pulse light source. In one embodiment such as light source benefits from one or more of the features of the embodiments related to supercontinuum generation discussed in this text.

As mentioned the strongest compression of the soliton may be found at the wavelength of the minimum of the dispersion curve. Accordingly in one embodiment the short pulse has a centre wavelength less than 500 nm from the minimum wavelength, such as less than 250 nm from the minimum wavelength, such as less than 100 nm from the minimum wavelength, such as less than 75 nm from the minimum wavelength, such as less than 50 nm from the minimum wavelength, such as less than 10 nm from the minimum wavelength, such as less than 5 nm from the minimum wavelength, such as less than 1 nm from the minimum wavelength.

In one embodiment it may be advantageous to optimize the supercontinuum to generate one or more strong peaks instead of a flat spectrum; this may be done by e.g. controlling the soliton dynamics to stabilize a large number of solitons at a certain wavelength in the output or to generate dispersive waves at a certain wavelength or the peak may be created by utilizing four wave mixing (FWM) effects to create a gain at a preferred wavelength and possibly by seeding the FWM gain at such a wavelength by pumping at several wavelengths. This seeding could be used to utilize gain at wavelengths around the dispersion minimum so that solitons or pump wavelengths could parametrically amplify peaks at phase-matched wavelengths in the longest part of the spectrum. The creation of such peaks in the output may be advantageous for many applications such as spectroscopy or selective ablation where increased power in particular wavelengths of the output spectrum may be advantageous. Accordingly, in one embodiment the output supercontinuum spectrum comprises at least one peak whose power weighted average wavelength is longer than the preferred pump wavelengths and whose full width half maximum (FWHM) envelope comprises at least 2% of the total output power, such as at least 5% of the total output power, at least 10% of the total output power, at least 15% of the total output power, at least 20% of the total output power, at least 30% of the total output power, at least 40% of the total output power, at least 50% of the total output power, at least 75% of the total output power.

FIGS. 3 and 14 show that in one embodiment a pump at the preferred pump wavelengths with pump power significantly above the threshold where the solitons red-shift past the minimum in the dispersion curve will produce a final soliton wavelength which is less dependent on pump wavelength and power than a positive gradient fiber. This means that for one embodiment variations in the pump power or pump wavelength will lead to smaller fluctuations in the final soliton wavelength than for a positive gradient fiber. It is well known in the literature that some supercontinuum sources generate a relatively noisy output spectrum and that this may limit their use in some applications. It is also known that in some supercontinuum sources a significant part of this noise originates in the fact that the pulse break-up and subsequent soliton collisions may randomly generate solitons with different energy. The solitons with different energy will red-shift to reach different wavelengths at the output of the fiber, and consequently the output will be noisy. FIGS. 3 and 14*b* show that in one embodiment the exact pump power and thus the soliton energy may have less effect on the final soliton wavelength, thus fluctuations in the soliton energy will have less effect on the output spectrum. In one embodiment the optimized dispersion profile may thus be used to produce a less noisy output supercontinuum. Conventional supercontinuum generated in silica fiber generally comprise relative intensity noise (RIN) noise on the order of −100 dB/Hz to −140 dB/Hz depending on pump and fiber characteristics and which part of the spectrum is measured. One embodiment may be used to generate an infrared supercontinuum which has relatively less noise than a conventional supercontinuum. Accordingly, in one embodiment the light source is used to generate a low noise supercontinuum where the relative intensity noise (RIN) in any part of the spectrum is less than 110 dB/Hz, such as less than 120 dB/Hz, such as less than 130 dB/Hz, such as less than 140 dB/Hz, such as less than 150 dB/Hz, such as less than 160 dB/Hz, such as less than 170 dB/Hz, such as less than 180 dB/Hz.

In one embodiment the object of the invention is to generate a near to mid infrared supercontinuum. In particular, the supercontinuum source may be useful in various measurement and analysis applications where the long wavelengths may be used to identify absorption wavelengths of particular species so that these can be used to identify or quantify the species. In one embodiment the supercontinuum source may also be used to generate collimated light that can emulate the continuous spectrum of a heat source. Such emulation may be useful in directed infrared countermeasures (DIRCM) for either military or civilian use or in the testing of various infrared sensing systems. Accordingly, in one embodiment the supercontinuum source may be used for microscopy, gas spectroscopy or infrared countermeasures.

In order to be able to access the information that may be gained by allowing the output supercontinuum or part thereof to interact with some species it may be beneficial to combine it with a detection system which may be wavelength selective such as a spectrometer, a hyperspectral camera, an up conversion based detection system, a single diode or a diode array which is sensitive to at least part of the wavelengths in the output supercontinuum.

A measurement or analysis system incorporating an embodiment of the supercontinuum source may in one embodiment be used to measure on a gaseous, solid or liquid medium or sample by analyzing either transmitted, reflected or exited light, by detecting acoustic vibrations caused in the sample or medium, stresses induced in the sample or medium or temperature changes caused in the medium. It should be noted that the source may also be used to measure on other types of media in systems where other interactions with the medium is monitored as will be readily apparent to one skilled in the art.

In one embodiment the generation of the supercontinuum spectrum does not involve the excitation of and subsequent stimulated photon emission from ions in the fiber. Thus, in this embodiment no active dopants are added to the glass material of the fiber. The term "active dopants" is meant to cover elements providing excitation of and subsequent stimulated photon emission from ions in the fiber. Examples of such active dopants which in this embodiment are not added to the glass material of the fiber include, but are not limited to, dysprosium (Dy), erbium (Er), holmium (Ho), neodymium (Nd), praseodymium (Pr), samarium (Sm), thulium (Tm) or ytterbium (Yb).

In one embodiment the supercontinuum light source comprises a termination housing on an input end and/or an output end of the nonlinear fiber. The termination housing provides a sealing which prevents or reduces the contact between the input end and/or output end of the nonlinear fiber and the atmosphere surrounding the termination housing.

In one embodiment, the supercontinuum light source comprises a splice housing on an input end and/or an output end of the nonlinear fiber, wherein the core of the nonlinear fiber is aligned with a core of a connecting fiber.

Fluoride glasses can be degraded through the contact with water as the flour (F) ions of the glass reacts with water ($H_2O$) to form hydrofluoric acid (HF) and hydroxyl groups (—OH). At the input and output end of a fiber light source, the strong optical field may accelerate this process and in some embodiments it may thus be advantageous to protect the output fiber of the source against humidity of the air. Accordingly, in one embodiment the end(s) of the fluoride glass fiber is (are) sealed in a termination housing which prevents ambient air from reaching the end facet(s) of the fiber. In one embodiment a sealed cavity inside the termination housing will comprise dry atmospheric air. In another embodiment a cavity inside the termination housing will comprise a dry passive gas, such as but not limited to, nitrogen or argon. In one embodiment the cavity is not completely sealed but is attached to a supply of dry inert gas so that the gas in a cavity inside the termination housing can be flushed with dry gas to prevent any humidity which enters the cavity from breaking down the fluoride fiber facet.

In one embodiment, the material of the termination housing immediately surrounding the nonlinear fiber will be at least partly transparent. This prevents the light guidance characteristics of the nonlinear fiber from being affected by heating caused by light absorption in the housing material close to the fiber.

In one embodiment, pump light enters the input end of the nonlinear fiber. In this embodiment, at least one surface of the termination housing on the input end of the nonlinear fiber has at least one surface which is transparent to most of the pump light. Thereby, pump light may enter the termination housing through the transparent surface and enter the input end of the nonlinear fiber.

In one embodiment, at least one surface of the termination housing on the output end of the nonlinear fiber has at least one surface which is transparent to at least some of the output light. Thereby, output light may exit the output end of the nonlinear fiber and exit the termination housing through the transparent surface.

In one embodiment the transparent surface comprises a transparent window made from a glass or crystal plate. This transparent window is in the form of an end cap attached to the facet of the nonlinear fiber itself. The end cap comprises a material more resistant to chemical decomposition or mechanical damage than the glass of the nonlinear fiber. In one embodiment the transparent surface comprises a lens which focuses or collimates the light as it passes through the lens.

In one embodiment, the transparent surface comprises a connecting fiber. In this embodiment the termination housing will be denoted a "splice housing". In one embodiment at least part of the facet of the nonlinear fiber inside the splice housing will be in contact with the end facet of the connecting fiber. In one embodiment the splice housing mechanically supports the nonlinear fiber and the connecting fiber so that alignment between the two fibers and/or the cores of the two fibers is maintained. In one embodiment the material of the mechanically supporting splice housing is a material with a softening point of more than 100 degrees Celsius. Such a softening point prevents heating caused from the absorption of light escaping from the interface between the fibers from softening the materials supporting the fiber, which could have caused the alignment between the fibers to be mechanically unstable.

In one embodiment the splice housing may take the form of a ferrule made from a transparent glass, such as a borosilica ferrule or tube, the inner diameter of which is slightly larger than the outer diameter of the nonlinear fiber and the connecting fiber. In one embodiment, the fibers are fixated in the ferrule using a transparent glue. In one embodiment this glue has a refractive index higher than the refractive index of the cladding of at least one of the fibers. In one embodiment, the glue extends inside the space between the outside diameter of the fiber and the inside diameter of the ferrule. In one embodiment, this glue is an epoxy glue which can be cured with ultraviolet light.

Other soft glasses than fluoride glasses may suffer from limited chemical stability. In one embodiment fibers made from soft glasses other than fluoride glass is used and their end facets may be protected by a termination housing using the same methods as described above for fluoride glass.

BRIEF DESCRIPTION OF DRAWINGS

The invention will be explained more fully below in connection with various embodiments and with reference to the drawings in which:

FIG. 15 shows an example of a termination housing which includes a cavity filled with dry air.

FIG. 16 shows an example of a termination housing in which an end cap is used to protect the facet of a nonlinear fiber

DETAILED DESCRIPTION OF THE DRAWINGS

Figure 1A:
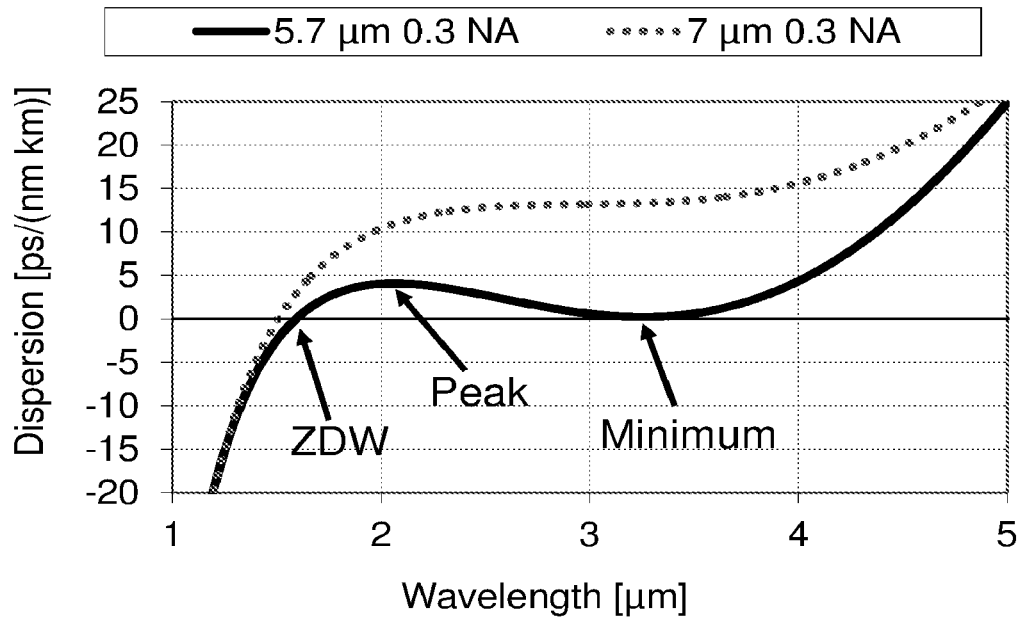
FIGS. 1a and 1b how the calculated dispersion and mode field diameter, respectively, as a function of wavelength for two fibers.

The figures are schematic and are simplified for clarity. Throughout, the same reference numerals are used for identical or corresponding parts. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope. Some preferred embodiments have been described in the foregoing, but it should be stressed that the invention is not limited to these, but may be embodied in other ways within the subject-matter defined in the following claims.

Figure 1B:
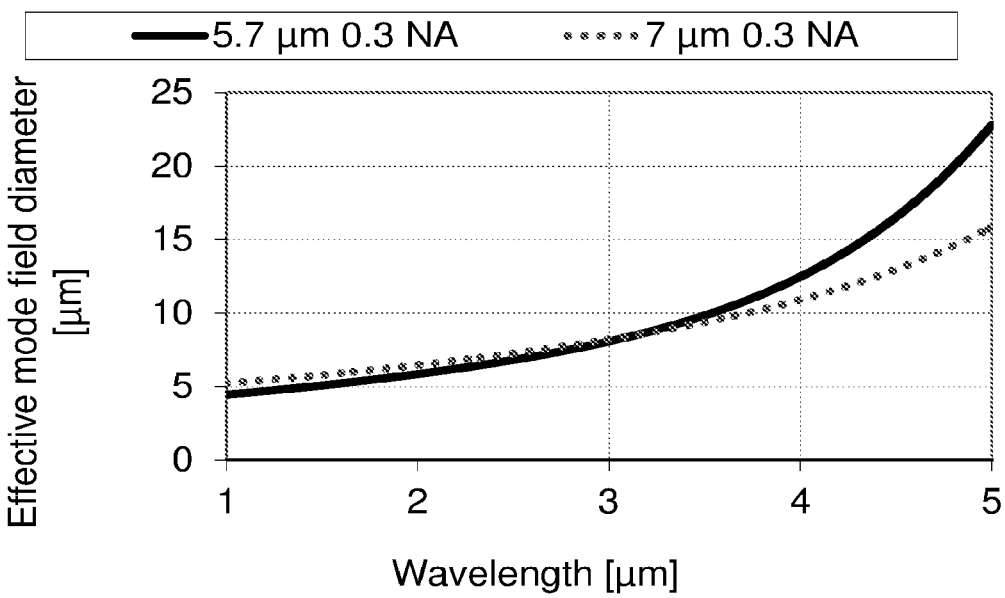

FIGS. 1a and 1b show the calculated dispersion and mode field diameter, respectively, as a function of wavelength for two fibers. In FIG. 1: (a) the dispersion curve of a fiber with a core diameter of 5.7 µm and a numerical aperture (NA) of 0.30 which represents one embodiment of the invention (solid) is shown. For comparison is illustrated the dispersion curve of a positive gradient fiber with a core diameter of 7 µm and a NA of 0.30 (dotted). In FIG. 1(b) is shown the effective mode field diameter curves of 5.7 µm, NA 0.30 fiber (solid) and the 7 µm, NA 0.30 fiber (dotted). These curves are based on a fiber with a cladding made from a ZBLAN material whose refractive index $n(\lambda)$ is given by the following Sellmeier equation:

$$n(\lambda) = \sqrt{1 + \frac{f_1 \lambda^2}{\lambda^2 - \lambda_1^2} + \frac{f_2 \lambda^2}{\lambda^2 - \lambda_2^2}} \quad \text{Eq. 4}$$

where $f_1=1.22514$, $f_2=1.52898$, $\lambda_1=0.08969$ and $\lambda_2=21.3825$. The refractive index of the core material is raised with a wavelength independent value sufficient to give the numerical apertures (NA) noted for the fibers mentioned. These NA were determined according to the standard equation for a fiber $NA=((n_{core})^2-(n_{clad})^2)^{1/2}$ where $n_{clad}$ and $n_{core}$ are the refractive index of the cladding and core respectively. It should be noted that the composition of the fiber material and the resulting Sellmeier constants can dramatically vary the position of the peak wavelength, the minimum wavelength and the fiber geometry necessary to produce them.

Figure 2A:
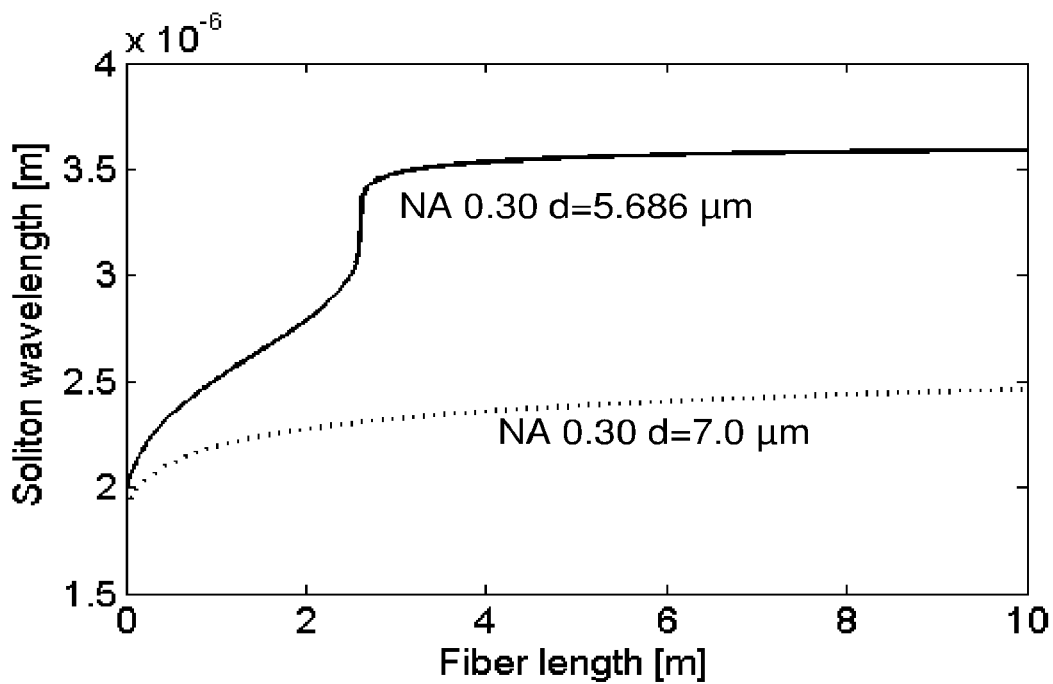
FIGS. 2a to 2d show calculated characteristics of solitons as they propagate through a nonlinear fiber according to one embodiment of the invention.
Figure 2B:
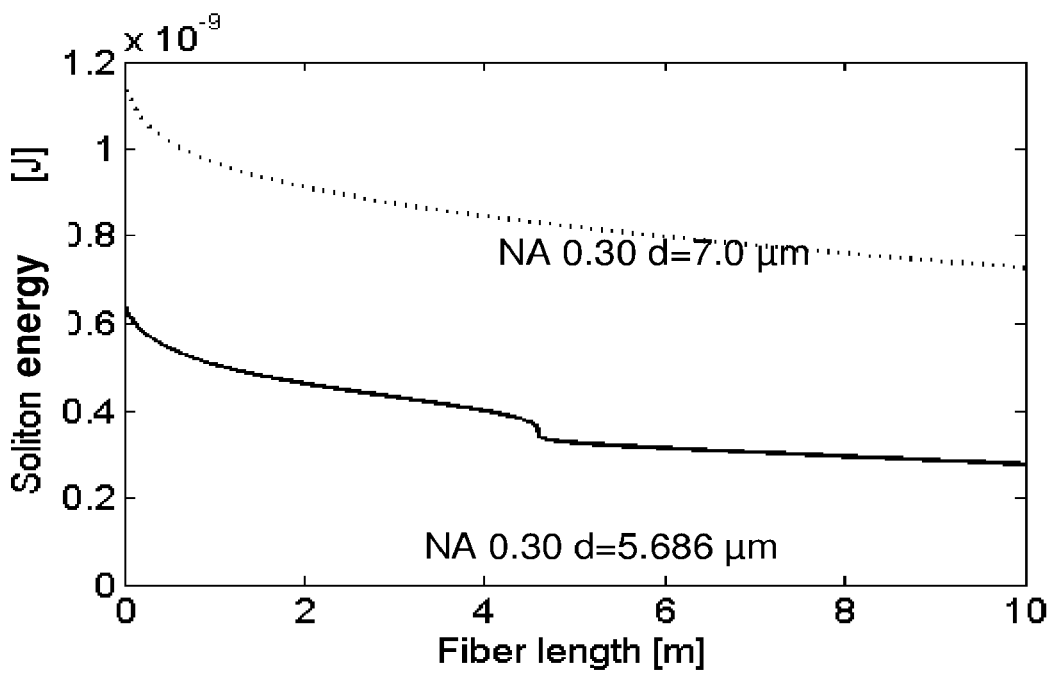
Figure 2C:
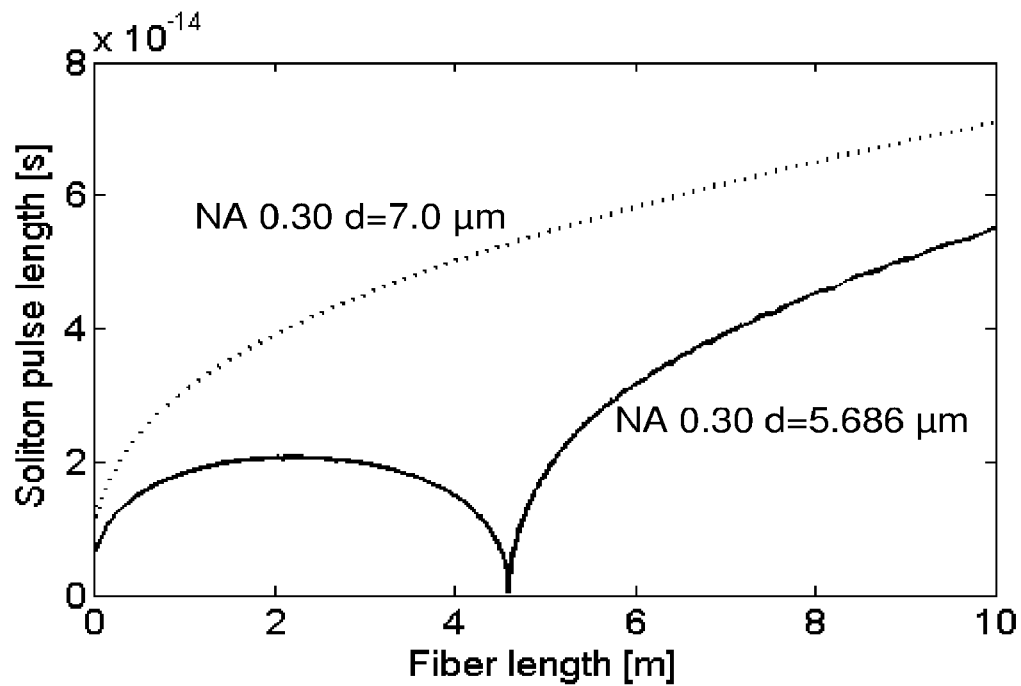
Figure 2D:
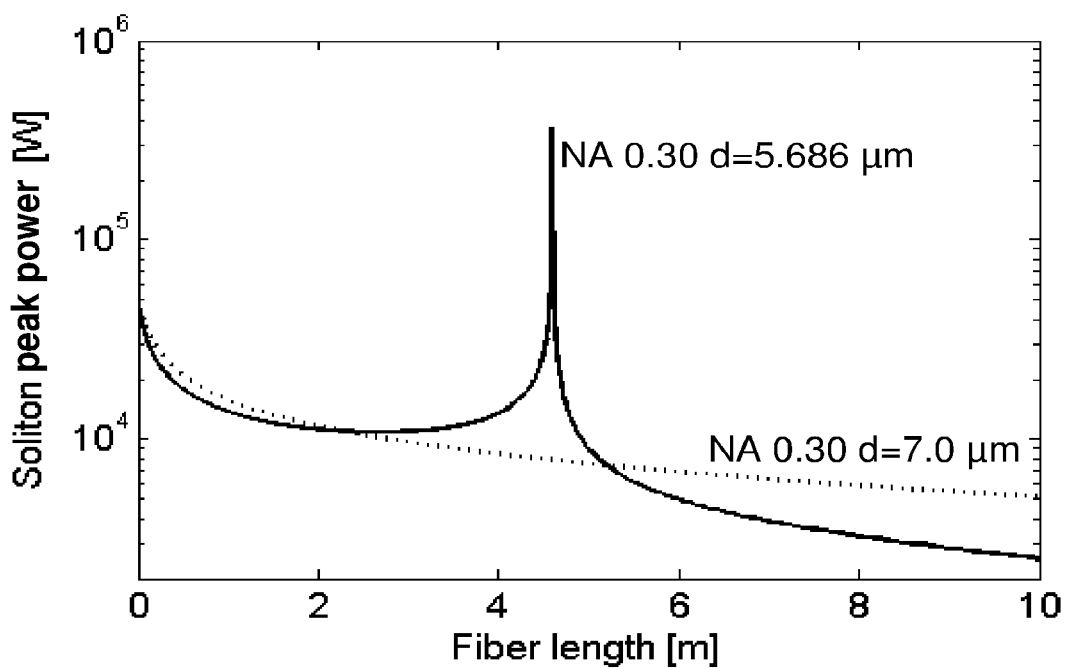

FIGS. 2a to 2d show calculated characteristics of solitons as they propagate through a nonlinear fiber according to one embodiment of the invention. In FIG. 2 we show the result of a moment method calculation of the characteristics of a soliton as it propagates through fibers with the dispersion profiles and MFDs shown in FIG. 1. The solid line illustrates the fiber with a core diameter of 5.7 µm and a NA of 0.30 which is one embodiment of the invention. The dotted line illustrates a positive gradient fiber with a core diameter of 7 µm and an NA of 0.30 for comparison. FIG. 2a shows a comparison of the soliton wavelength along the fiber in the two fibers pumped at 1900 nm. FIG. 2a shows the centre wavelength of the soliton as it propagates through the fiber. FIG. 2b shows the soliton energy as a comparison of the soliton energy along the fiber in the two fibers pumped at 1900 nm. FIG. 2c shows a comparison of the soliton pulse length along the fiber in the two fibers pumped at 1900 nm. FIG. 2d shows the soliton peak power along the fibers in the two fibers pumped at 1900 nm. For both fibers it was assumed that the solitons were generated in the Modulation instability breakup of a pump with a peak power of 10 kW and a wavelength of 1900 nm and that the breakup occurred instantaneously at 0 m. Any effect of soliton collisions was ignored.

Figure 3A:
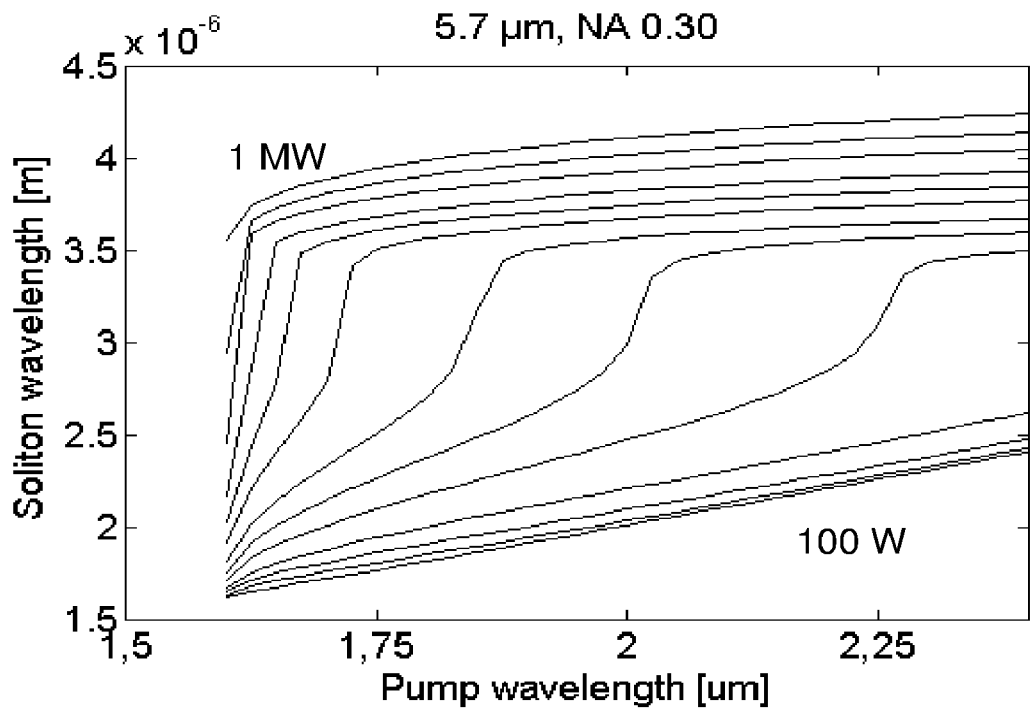
FIGS. 3a and 3b show the exemplary calculated wavelength that a soliton may reach depending on pump power and pump wavelength.
Figure 3B:
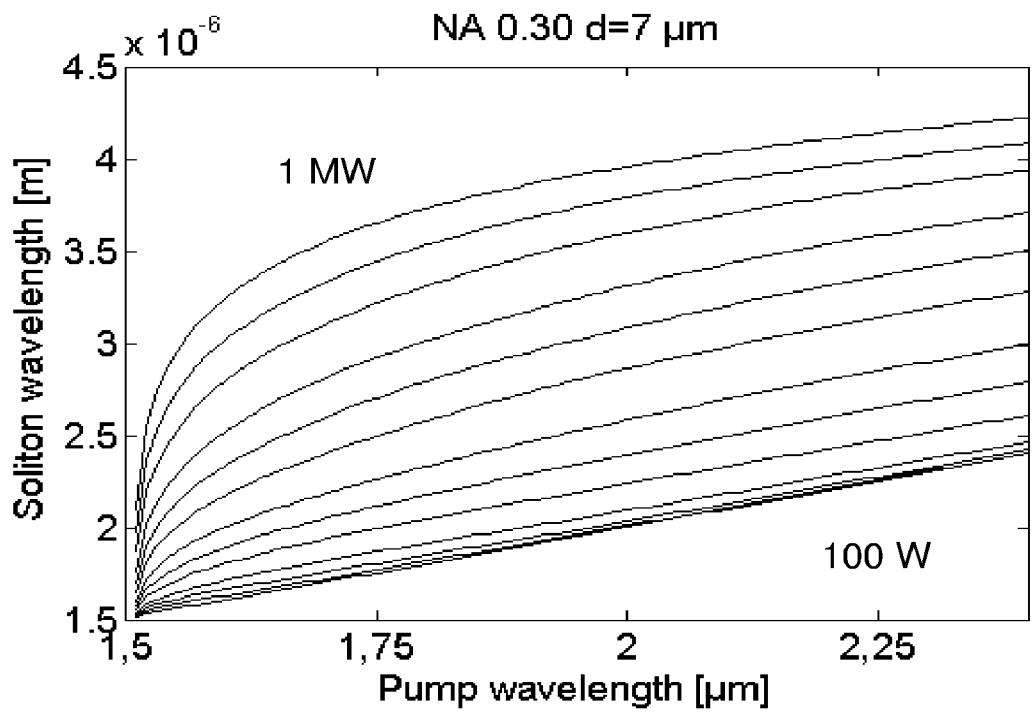

FIGS. 3a and 3b show the exemplary calculated wavelength that a soliton may reach depending on pump power and pump wavelength. FIGS. 3a and 3b show the result of moment method calculations of the centre wavelength of the soliton at the output of a 10 m fiber as a function of pump wavelength for the 13 different pump peak powers 100 W, 250 W, 500 W, 1 kW, 2.5 kW, 5 kW, 10 kW, 25 kW, 50 kW, 100 kW, 250 kW, 500 kW and 1 MW respectively starting with the lowest powers at the bottom and the highest values at the top. FIG. 3a shows the result for a ZBLAN fiber with a core size of 5.7 µm and NA of 0.30, which represents one embodiment of the invention, and FIG. 3b shows the result for a positive gradient ZBLAN fiber with NA of 0.30 and a core diameter of 7 µm.

Figure 4:
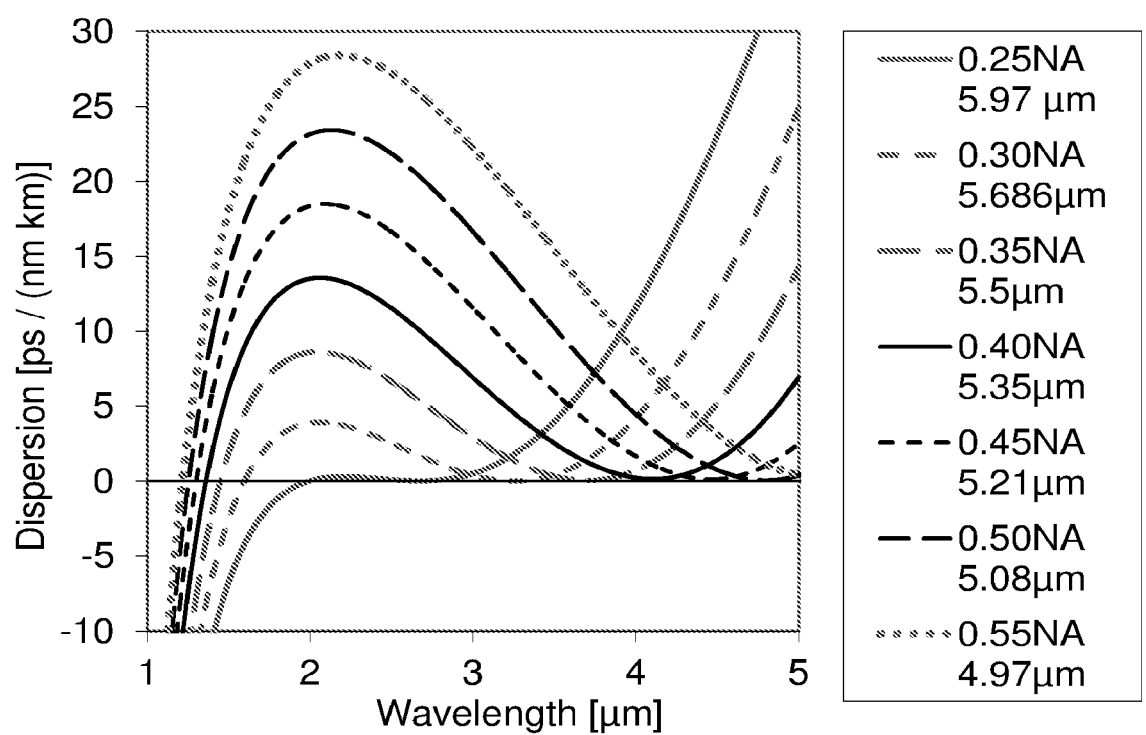
FIG. 4 shows the calculated dispersion curves of a series of fibers according to embodiments of the fiber.

FIG. 4 shows the calculated dispersion curves of a series of fibers according to embodiments of the fiber. In FIG. 4 a series of dispersion curves showing dispersion for nonlinear fibers according to the invention with 7 different numerical apertures (NAs) are shown.

Figure 5A:
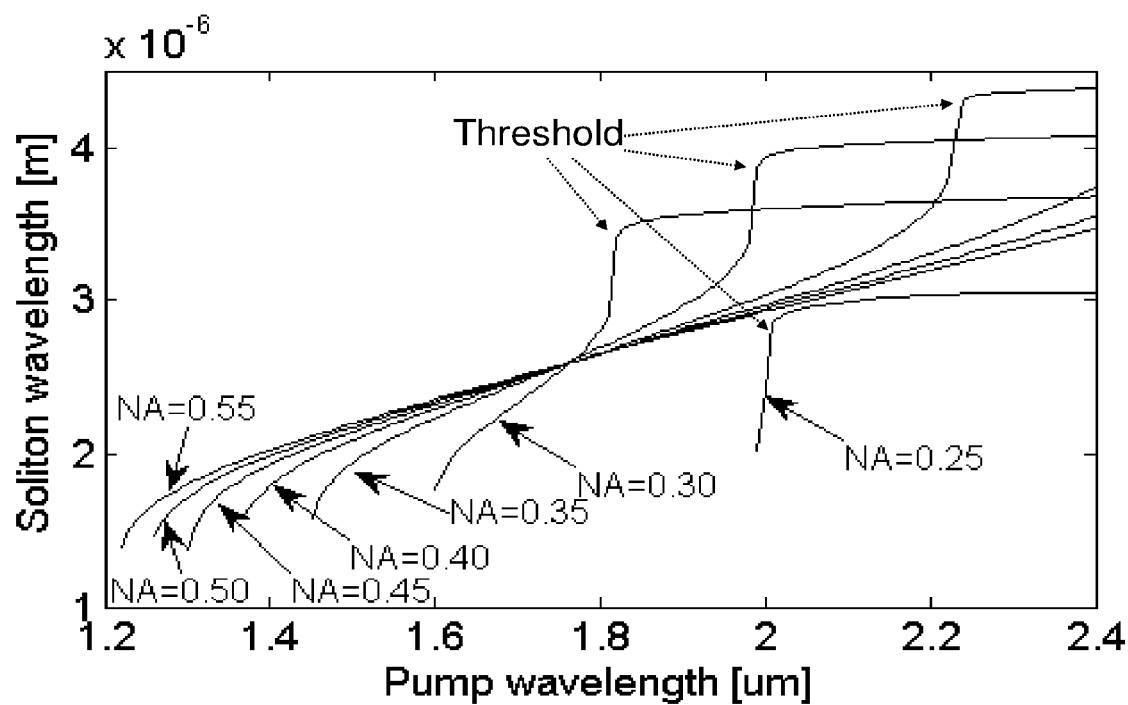
FIGS. 5a and 5b show, for two pump powers, the calculated wavelength that a soliton may reach depending on pump wavelength in fibers according to embodiments of the invention.
Figure 5B:
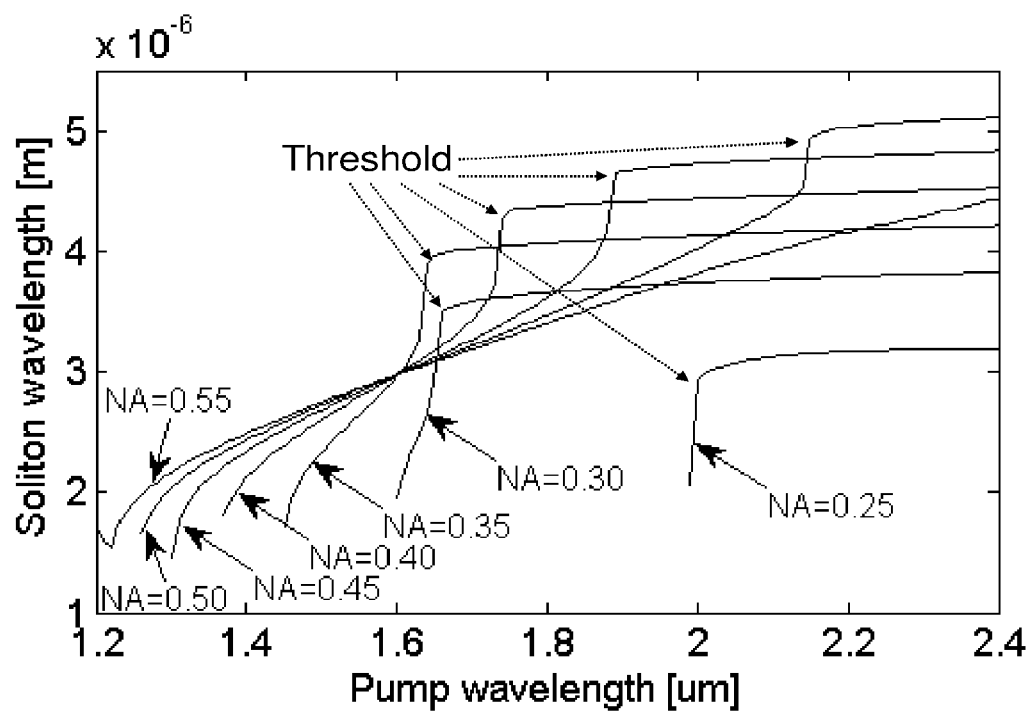

FIGS. 5a and 5b show, for two pump powers, the calculated wavelength that a soliton may reach depending on pump wavelength in fibers according to embodiments of the invention. In FIG. 5a is shown the result of moment method calculations of the centre wavelength of the soliton at the output of a 10 m fiber as a function of pump wavelength for fibers with the 7 different dispersion profiles shown in FIG. 4. In FIG. 5a we assume a pump with an initial peak power of 10 kW and in FIG. 5b we assume a pump with an initial peak power of 50 kW.

Figure 6:
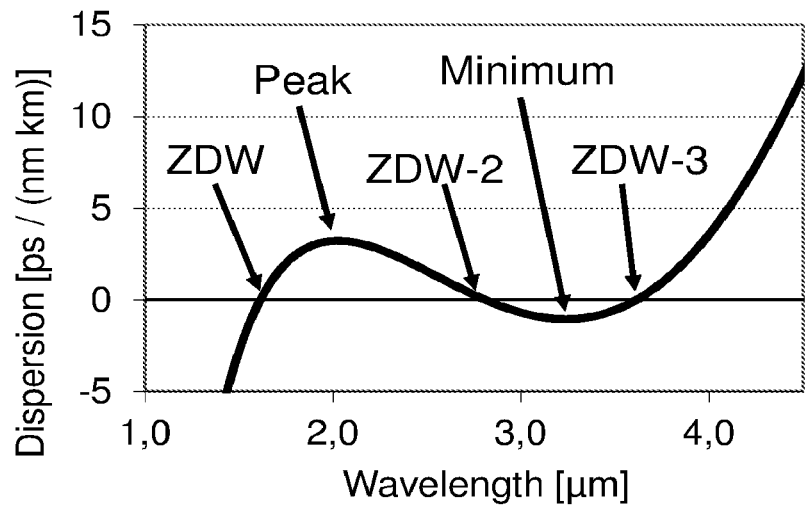
FIG. 6 illustrates the calculated dispersion profile for a fiber with three zero dispersion wavelengths.

FIG. 6 illustrates the calculated dispersion profile for a fiber according to one embodiment of the invention, with three zero dispersion wavelengths. In FIG. 6 the dispersion curve for one embodiment in which the dispersion at the minimum is negative (normal) is shown. Arrows mark the location of the three zero dispersion wavelengths the ZDW, ZDW-2 and ZDW-3. In this embodiment the solitons stop at a wavelength shorter than ZDW-2 and generate dispersive waves above it. In some of these embodiments the region of normal dispersion around the minimum will be narrow so that dispersive waves will also be generated at wavelengths longer than ZDW-3 thus generating light considerably above the minimum.

Figure 7:
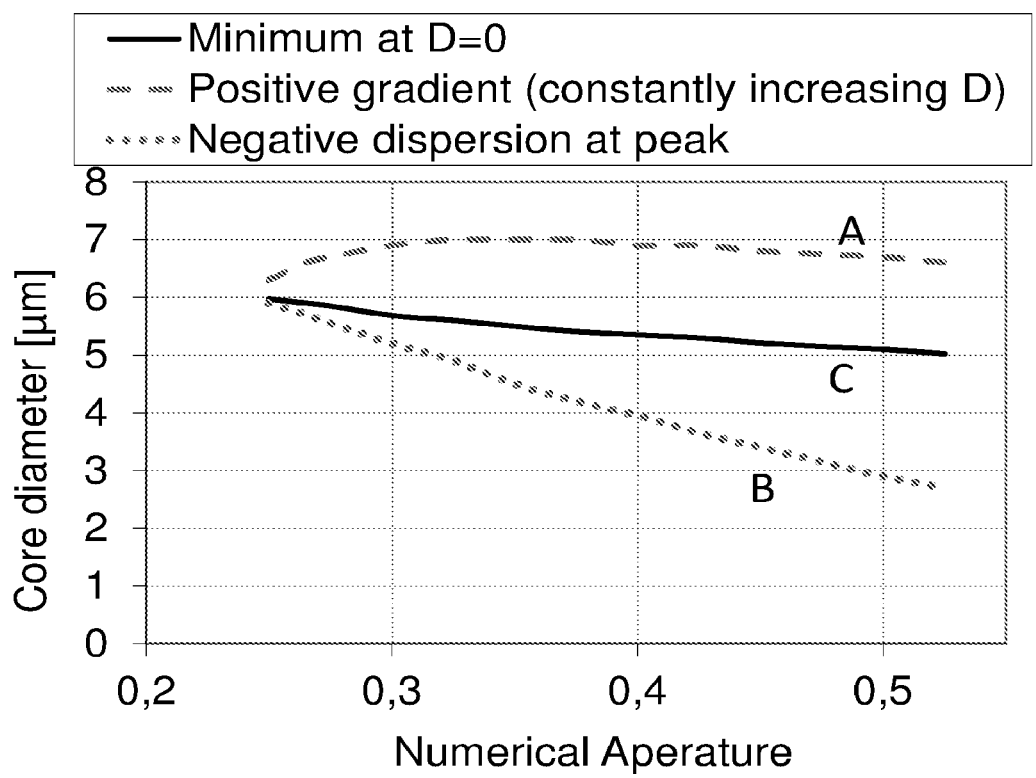
FIG. 7 shows exemplary calculated numerical aperture and core diameter of step index fibers according to the invention.

FIG. 7 shows exemplary calculated numerical aperture and core diameter of step index fibers according to the invention. In FIG. 7 the numerical aperture and core diameter of step index fibers which will provide a dispersion profile relevant to this invention is shown for a material with a material dispersion described by the Sellmeier constants $f_1=1.22514$, $f_2=1.52898$, $\lambda_1=0.08969$ and $\lambda_2 2=21.3825$.

The dashed curve (A) shows the maximum core diameter and minimum numerical aperture which will constitute a fiber with a peak and minimum in the dispersion curve. Fibers with numerical apertures smaller than and core diameters above this curve will provide positive gradient fibers whose dispersion curves cannot be the to have a peak or minimum.

The dotted curve (B) represents the minimum numerical aperture and minimum core diameter which will provide fibers which have anomalous dispersion at the peak of the dispersion curve. If the dispersion at the peak of the dispersion curve is not anomalous the pump will not break up and create solitons and thus there will be no red-shift of solitons. Fibers with numerical aperture less than this curve and core sizes below this curve will thus not yield dispersion curves which are advantageous for long wavelength supercontinuum generation according to this invention. The solid curve (C) represents numerical apertures and core diameters which yield fibers with dispersion profiles according to an embodiment of the invention in which the dispersion at the minimum of the dispersion curve remains positive (anomalous) but is close to zero. It should be noted that the core diameters and numerical apertures related to these curves depend on the material as they represent a balance between the material dispersion and the waveguide dispersion. Similar curves can be calculated for other materials and such curves may be used to design embodiments of the invention.

Figure 8:
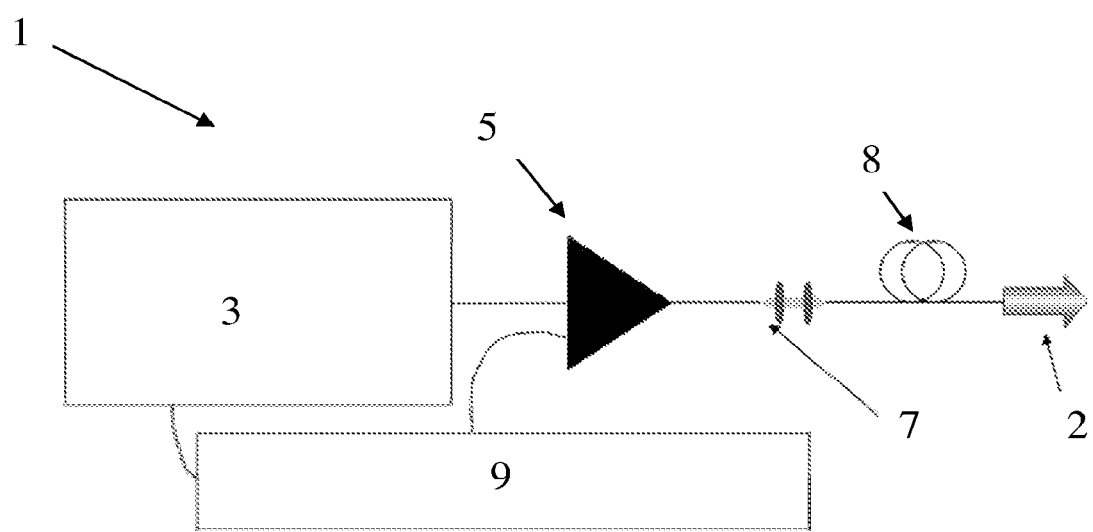
FIG. 8 shows a diagram of an exemplary pump system of an embodiment of the invention.

FIG. 8 shows a diagram of an exemplary pump system 1 of an embodiment of the invention. FIG. 8 shows a setup used in some embodiments of the invention where a red-shifted mode locked erbium laser 3 is used to deliver of short pulses at a wavelength of approx. 1.9 µm with an average power of approx 30 mW and a repetition rate of 40 MHz.

These are then amplified in a thulium amplifier 5 to deliver an amplifier output 7 of 2.7 W, 40 MHz, 1 ps pulses at 1.9 µm which are then coupled into a ZBLAN fiber 8 with a numerical aperture of 0.27 and a core diameter of 6.2-6.4 µm. The emitted supercontinuum 2 has more than 0.5 W output power, 40 MHz repetition rate and covers a spectrum of at least 1.5-4.2 µm. The light source is controlled through the use of laser drivers and other electronics 9.

Figure 9A:
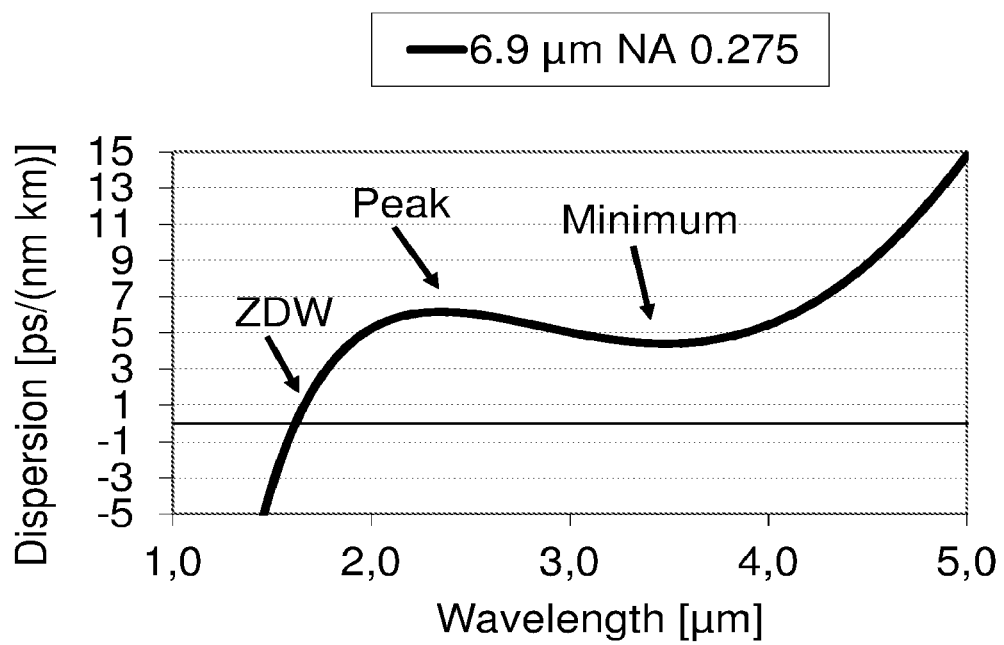
FIGS. 9a and 9b show a calculated dispersion profile and an example of spectra generated in one embodiment of the invention, respectively.
Figure 9B:
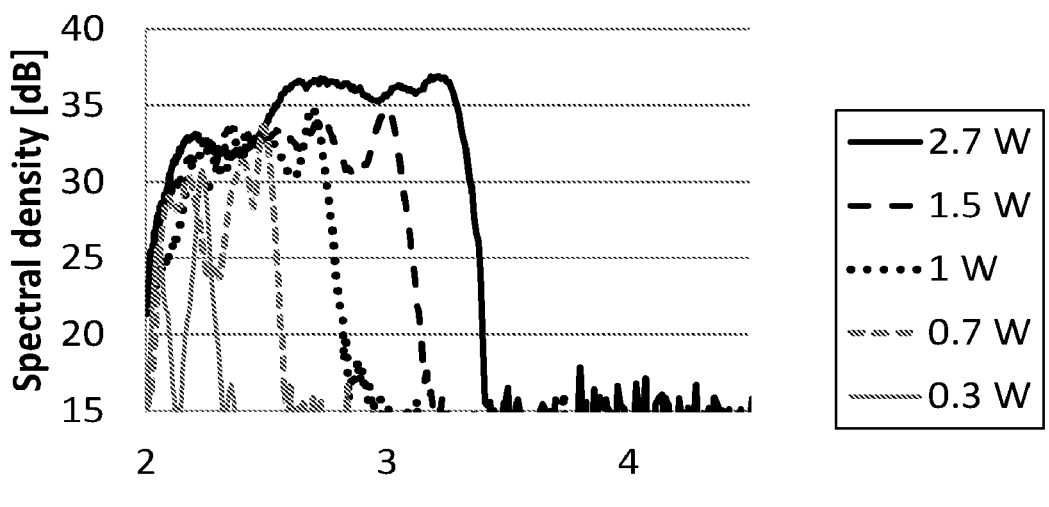

FIGS. 9a and 9b show a calculated dispersion profile and an example of spectra generated in one embodiment of the invention, respectively. In FIG. 9b the spectra generated in one embodiment is shown. The curves are labeled according to the pump average power and have not been corrected for instrument sensitivity. In FIG. 9a is shown the approximate dispersion profile of the fiber in which the spectrum was generated. The fiber dispersion curve has a dispersion at the minimum which is only a little less than the value at the peak and the fiber is pumped with picosecond pulses of up to about 50 kW peak power at a wavelength of approx 1900 nm. In one embodiment this type of dispersion profile generates a spectrum which increases gradually with pump power but which do not reach above the minimum of the minimum of the dispersion profile.

Figure 10A:
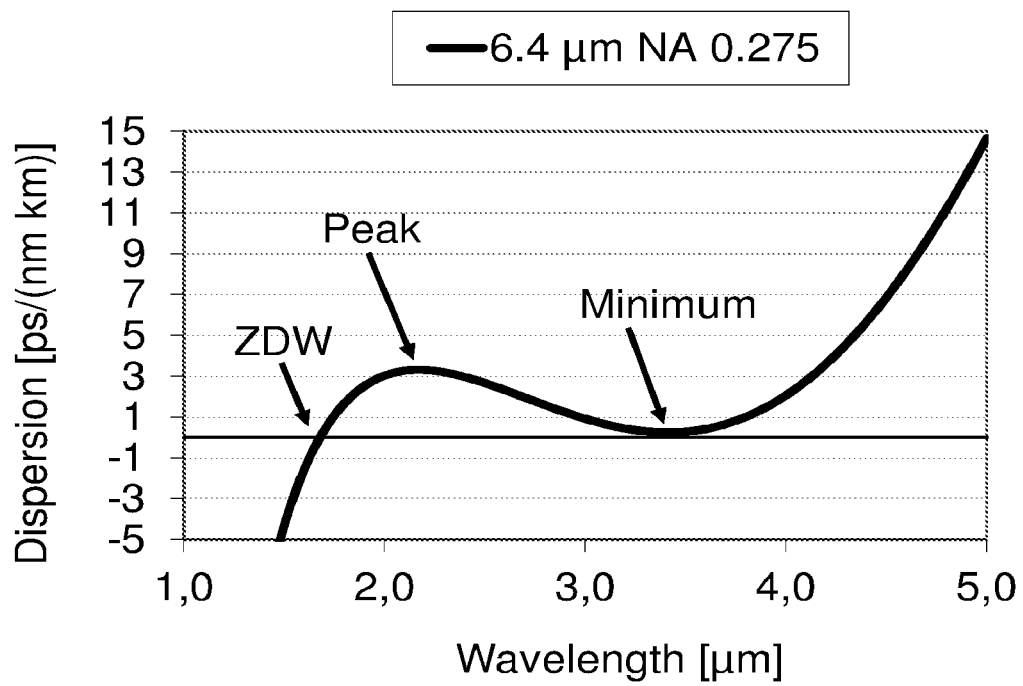
FIGS. 10a and 10b show a calculated dispersion profile and an example of spectra generated in an embodiment of the invention, respectively.
Figure 10B:
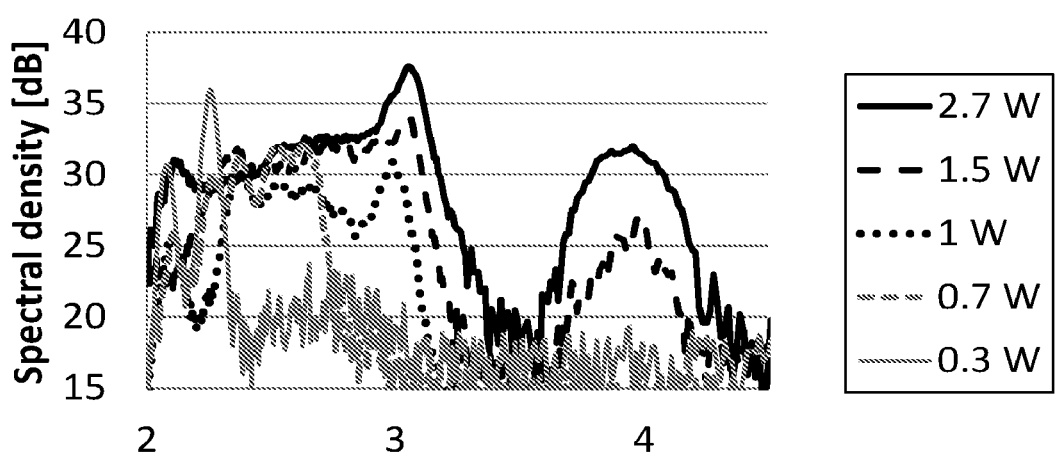

FIGS. 10a and 10b show a calculated dispersion profile and an example of spectra generated in an embodiment of the invention, respectively. In FIG. 10b the spectra generated in an embodiment is shown; the curves are labeled according to the pump average power and have not been corrected for instrument sensitivity. FIG. 10a show the approximate dispersion profile of the fiber in which the spectrum was generated. The fiber dispersion curve shows a dispersion at the minimum which is nearly zero, and the fiber is pumped with picosecond pulses of up to about 50 kW peak power at a wavelength of approx 1900 nm. In one embodiment this type of dispersion profile generates a spectrum which increases gradually up to just below the dispersion minimum after which it increases to above the minimum with a dip in the spectrum being created at the wavelengths corresponding to the minimum of the dispersion.

Figure 11A:
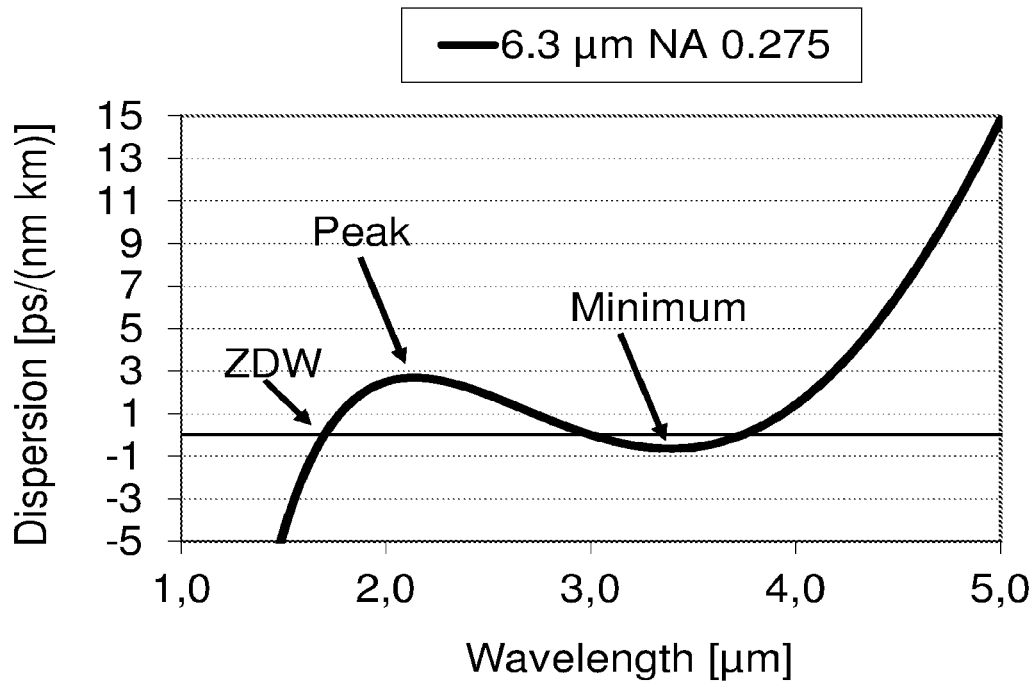
FIGS. 11a and 11b show a calculated dispersion profile and an example of spectra generated in an embodiment of the invention, respectively.
Figure 11B:
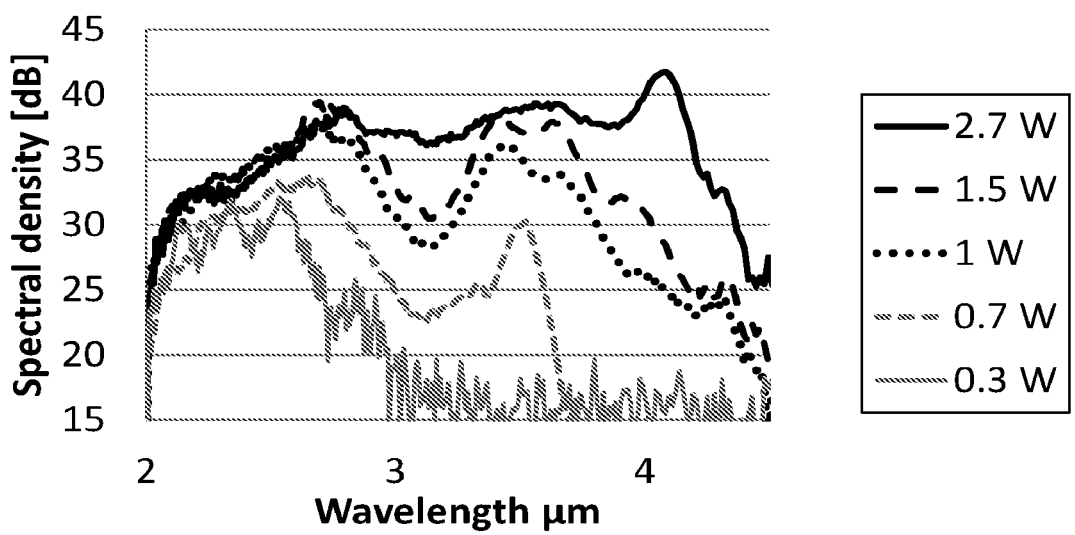

FIGS. 11a and 11b show a calculated dispersion profile and an example of spectra generated in an embodiment of the invention, respectively. In FIG. 11b the spectra generated in an embodiment is shown. The curves are labeled according to the pump average power and have not been corrected for instrument sensitivity. FIG. 11a shows the approximate dispersion profile of the fiber in which the spectrum was generated. The fiber dispersion curve shows a dispersion at the minimum which is slightly below zero and the fiber is pumped with picosecond pulses of up to about 50 kW peak power at a wavelength of approx 1900 nm. In one embodiment this type of dispersion profile generates a spectrum which increases gradually up to just below ZDW-2. The solitons in the spectrum just below the ZDW-2 can then achieve spectral overlap with their phase matched wavelengths above ZDW-2 and generate a localized dispersive wave in the normal dispersive region surrounding the minimum of the dispersion curve. In one embodiment phase matching and spectral overlap above ZDW-3 generate a peak at wavelengths longer than ZDW-3 when sufficient pump power is applied.

Figure 12A:
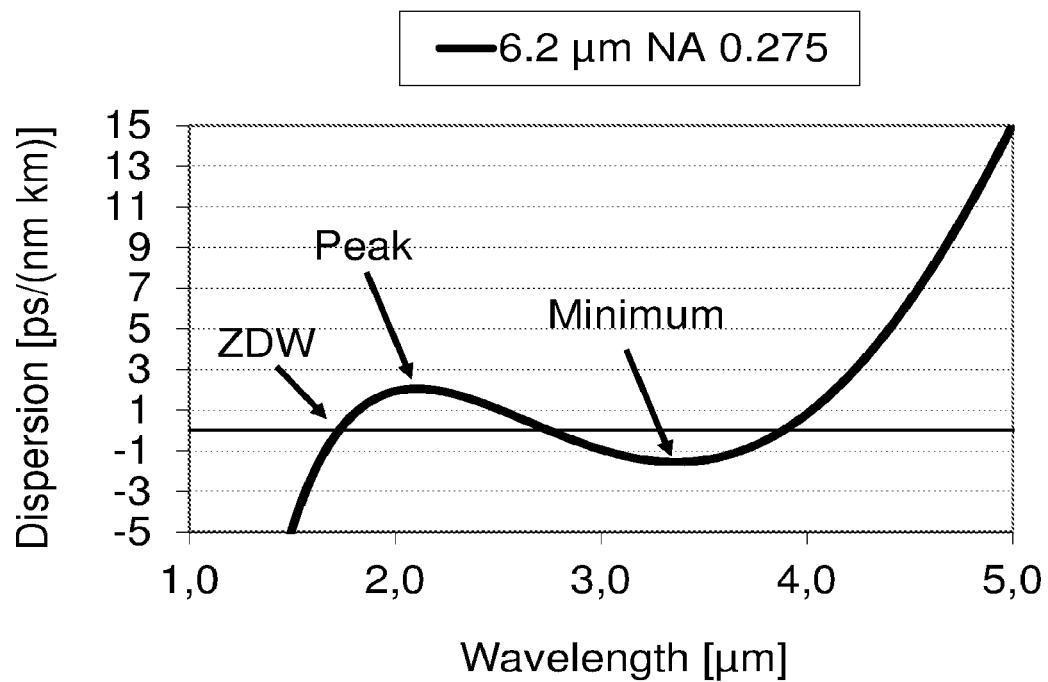
FIGS. 12a and 12b show a calculated dispersion profile and an example of spectra generated in one embodiment of the invention, respectively.
Figure 12B:
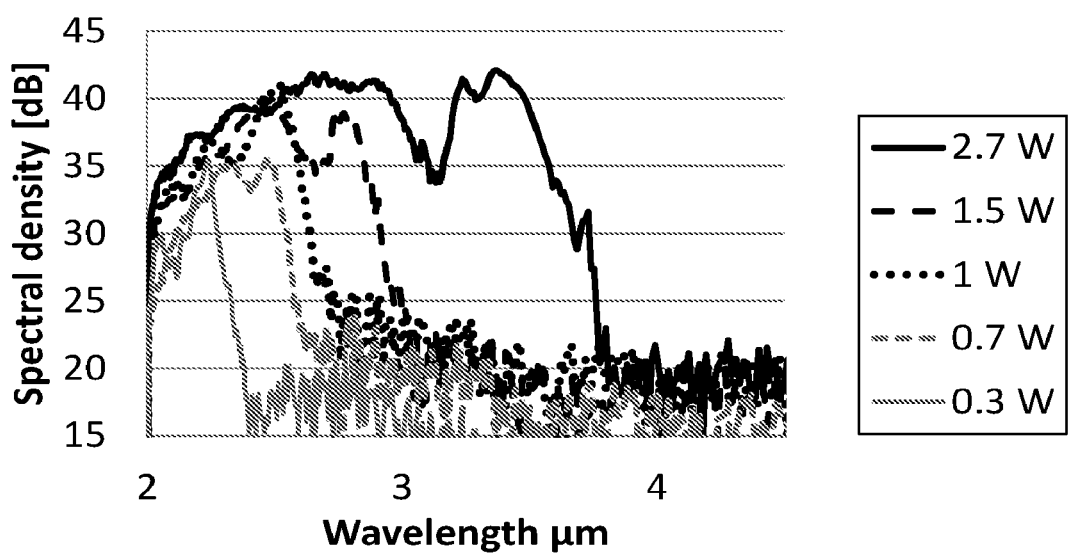

FIGS. 12a and 12b show a calculated dispersion profile and an example of spectra generated in one embodiment of the invention, respectively. In FIG. 12b the spectra generated in one embodiment is shown. The curves are labeled according to the pump average power and have not been corrected for instrument sensitivity. FIG. 12a shows the approximate dispersion profile of the fiber in which the spectrum was generated. The fiber dispersion curve shows a dispersion minimum in the middle of a wide wavelength interval of normal dispersion and the fiber is pumped with picosecond pulses of up to about 50 kW peak power at a wavelength of approx 1900 nm. In one embodiment this type of dispersion profile generates a spectrum which increases gradually up to just below ZDW-2 and then solitons generate a dispersive wave above the second ZDW. However since the normal dispersive region is wide there is not efficient spectral overlap with phase matched wavelengths above ZDW-3 and thus there may be no light generated above ZDW-3.

Figure 13:
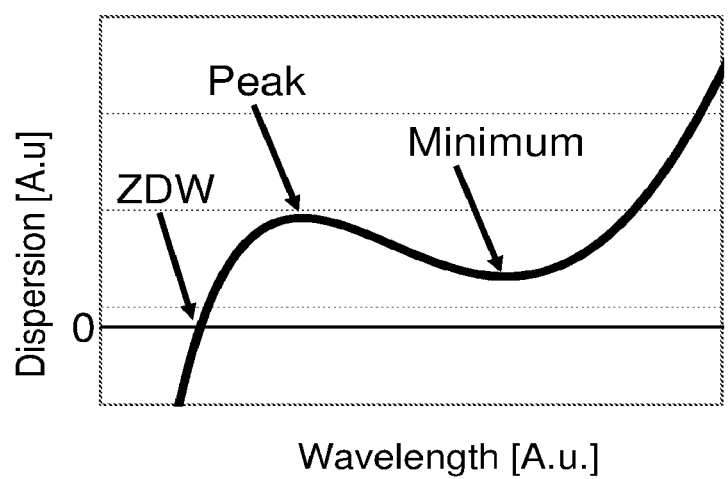
FIG. 13 shows an example of the relative location of the ZDW, Peak and Minimum.

In FIG. 13 an example of the relative location of the ZDW, the peak and the minimum is shown. As noted above, there may in principle be more than one local maximum following (i.e. as the wavelength is increased) the ZDW, and/or there may be more than one local minimum following the peak. In one embodiment the peak is the first local maximum following the ZDW and/or in one embodiment the minimum is the first local minimum following the peak. In one embodiment the wavelength referred to as the zero dispersion wavelength (ZDW) in this text is the shortest wavelength where the dispersion crosses zero or is substantially zero as discussed above. In one embodiment it is the second, third, four, fifth or higher shortest wavelength where the dispersion crosses zero or is substantially zero. If the dispersion profile crosses zero again at longer wavelengths after the ZDW applied in the invention these crossing wavelengths will be referred to as ZDW-2 and ZDW-3 as can be seen in FIG. 6.

Figure 14A:
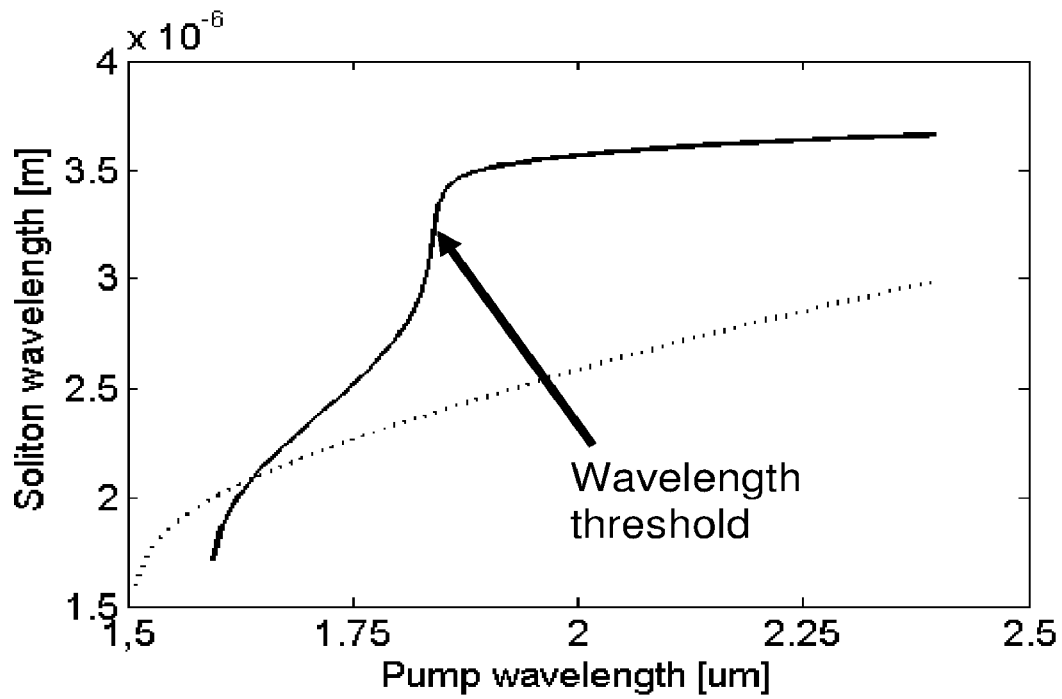
FIGS. 14a and 14b show an exemplary calculated final soliton wavelength as a function of wavelength with a fixed pump power and as a function of pump power at a fixed pump wavelength, respectively.
Figure 14B:
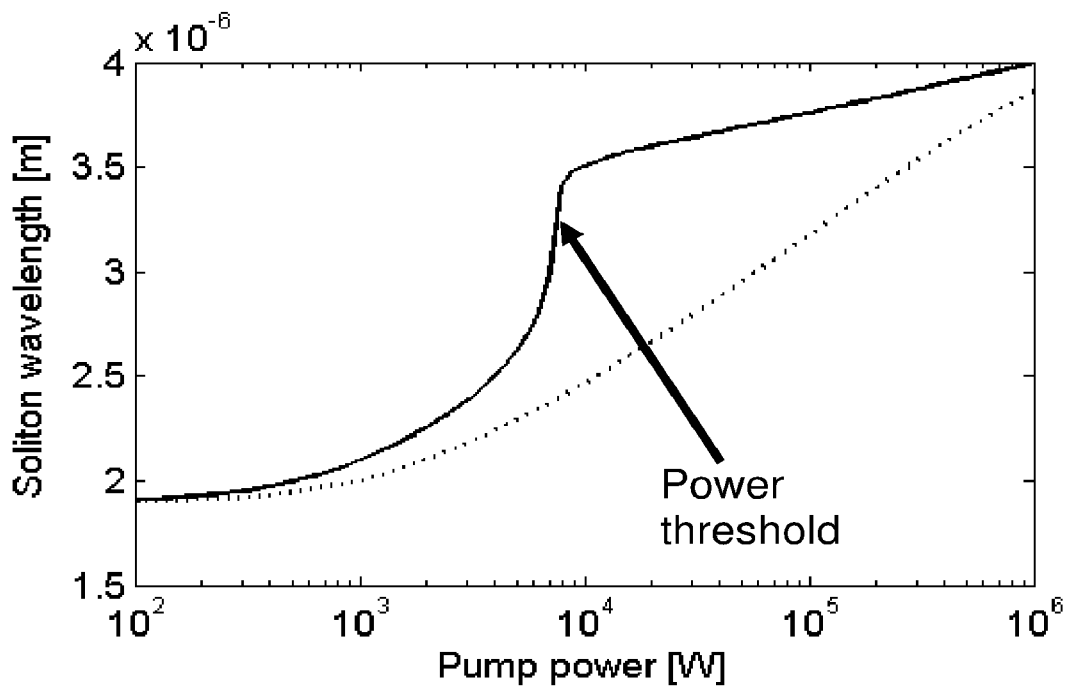

FIGS. 14a and 14b show an exemplary calculated final soliton wavelength as a function of wavelength with a fixed pump power and as a function of pump power at a fixed pump wavelength, respectively. In FIG. 14a the soliton wavelength reached at the end of 10 m fiber pumped at a fixed pump peak power of 10 kW is shown as a function of pump wavelength. An interval of rapid increase in wavelength referred to as the wavelength threshold has been indicated. In FIG. 14b the soliton wavelength reached at the end of 10 m fiber pumped at a fixed wavelength of 1900 nm is shown as a function of pump peak power an interval of rapid increase in wavelength which will be called the power threshold has been indicated. The two FIGS. 14a and 14b show the result for the same two fibers that were treated in FIG. 1, FIG. 2 and FIG. 3, and here the solid line also represents a fiber according to one embodiment of the invention while the dotted line is represents a positive gradient fiber. The wavelength and power thresholds which are seen for the fiber according to one embodiment of the invention occur when the initial pulse break-up generates solitons that can reach a wavelength where their red-shift are accelerated by the low dispersion near the minimum of the dispersion curve.

Various embodiments of the invention may be used in a wide range of applications including, but not limited to infrared counter-measures, chemical sensing, non-contact or remote sensing of firearms, weapons or drugs, industrial chemical sensing, such as in advanced semiconductor process control, combustion monitoring, chemical plant process control, petrochemical production or control of refining processes, bio-medical imaging and/or ablation, in an optical coherence tomography configuration for semiconductor wafer imaging or defect location, or in free space or fiber based telecommunications. In all these applications the spectra that can be generated using the invention may be of benefit to the application.

In an embodiment the supercontinuum was generated in a nonlinear fiber made from ZBLAN glass and pumped with 2 W average power from a 40 MHz pulse train of pulses with a full width half maximum (FWHM) length of approx 1 ps. Delivered from a setup similar to the one shown in FIG. 8. This means that the peak power of the pump was approx. 50 kW. This pump light was coupled into a ZBLAN fiber with a numerical aperture of approx 0.27 and a core size of 6-6.9 µm with a coupling efficiency of approx. 70%. The core size numerical aperture and material dispersion of the ZBLAN fiber was estimated and used to calculate the approximate dispersion curves shown in FIG. 9-12. FIG. 9-12 also show spectra generated in different ZBLAN fiber using the setup described here and shown in FIG. 8.

In another embodiment pulses with a envelope pulse length of 3 ns, a repetition rate of 30 kHz, an average power of 200 mW (pump peak power of approx 2.2 kW) and a wide spectrum stretching from 1.9 to 2.4 µm was coupled into a similar ZBLAN fiber with an efficiency of approx. 60% and the resulting spectrum spanned from 1.5 µm to 4.1 µm. This spectrum had approx the same spectral width as when the same fiber was pumped with the 1 ps system described above which may confirm that when fibers with the optimized dispersion profile are pumped with sufficient peak power, additional peak power does not increase the spectral width much.

FIG. 15 shows an example of a termination enclosure 10 in which includes a cavity filled with dry air. FIG. 15 displays a diagram of one embodiment of a termination enclosure 10 in which a nonlinear fiber 11 with a coating 12 is fixed in a transparent ferrule 13. The transparent ferrule 13 forms part of the termination enclosure 10 and is inserted into one side of a termination housing 14. At the other side of the termination housing 14, a transparent window or lens 16 allows the light to pass out of the termination housing 14 and thus out of the termination enclosure 10. The termination housing 14, the ferrule 13 and the window or lens 16 provides a closed cavity 15 which is filled with dry air or dry inert gas. The interfaces between fiber 11 and ferrule 13, between the ferrule 13 and the rest of the termination housing 14 and between the lens or window 16 and the rest of the termination housing 14 are all airtight, preventing humidity from the surrounding air from entering the cavity 15.

FIG. 16 shows an example of a termination enclosure 10' in which an end cap 17 is used to protect the facet of a nonlinear fiber 11. In FIG. 16 is shown an embodiment of a termination enclosure 10' in which a nonlinear fiber 11 with a coating 12 is fixed in a transparent ferrule 13. The transparent ferrule 13 together with a transparent end cap 17 form part of the termination enclosure 10'. The interfaces between the fiber 11 and the ferrule 13 as well as between the ferrule 13 and the end cap 17 are airtight, preventing humidity from the surrounding air from entering the cavity between the fiber 11 and the ferrule 13. The end cap 17 is transparent in order to allow the light from the fiber 11 to pass through the end cap 17 and thus out of the termination enclosure 10'. In one embodiment the airtightness is ensured by bonding the ferrule 13 and/or the end cap 17 directly to the fiber 11. In one embodiment, the end cap 17 has a shape and/or refractive index distribution that allows it to function as a lens for the output light.

Figure 17:
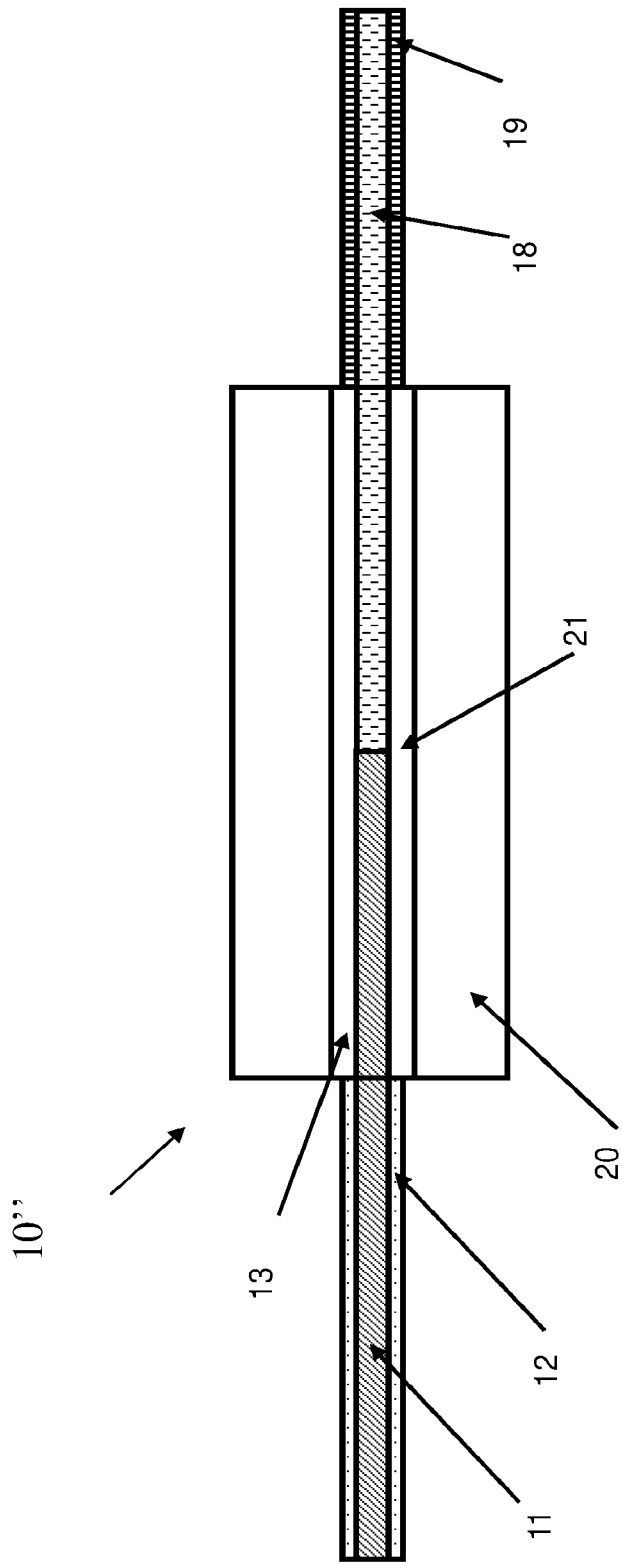
FIG. 17 shows an example of a splice housing in which a nonlinear fiber is aligned with a connecting fiber and sealed off from surrounding atmosphere by the splice housing.

FIG. 17 shows an example of a termination enclosure 10" wherein a nonlinear fiber 11 is aligned with a connecting fiber 18 and is sealed off from the surrounding atmosphere by a splice housing 20. FIG. 17 displays a diagram of one embodiment of a splice housing 20 in which the nonlinear fiber 11 with a coating 12 is fixed in a transparent ferrule 13 which forms part of the termination enclosure 10". The fiber 11 is input into one side of the splice housing 20 and another, connecting fiber 18 with its coating 19 is input into the splice housing 20 from the other side, so that the end facets of the two fibers 11 and 18 meet at a point 21 inside the ferrule 13, inside the splice housing 20. In one embodiment, a material fills the void between the ferrule and the fibers. This material may protect the fiber against the surrounding atmosphere, and may mechanically support the fiber so that the alignment between the fiber facets and/or the cores of the fibers is maintained at the meeting point 21. In one embodiment, the splice housing 20 also supports the nonlinear fiber 11 and the connecting fiber 18 to assist in maintaining the alignment between their cores.

In one embodiment, the connecting fiber 18 has a different glass melting point than the nonlinear fiber 11.

In one embodiment, at least part of the material of the splice housing is transparent in at least part of the optical spectrum where at least one of the nonlinear fiber and the connecting fiber are also transparent.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

The invention is defined by the features of the independent claim(s). Different embodiments are defined in the dependent claims. Any reference numerals in the claims are intended to be non-limiting for their scope.

Some embodiments have been shown in the foregoing, but it should be stressed that the invention is not limited to these, but may be embodied in other ways within the subject-matter defined in the following claims.

The invention claimed is:

1. A supercontinuum light source comprising a pump light source arranged to emit pump light and a nonlinear fiber having a core arranged to receive the pump light wherein said pump light and nonlinear fiber are arranged so that a supercontinuum comprising infrared wavelengths is generated in said nonlinear fiber from said pump light, said nonlinear fiber having a dispersion profile, the dispersion profile comprising:

a. a zero dispersion wavelength ZDW,
    b. a positive peak value at a peak wavelength longer than said zero dispersion wavelength ZDW, and
    c. a minimum value of dispersion at a minimum wavelength longer than the peak wavelength, wherein said pump light is arranged to comprise energy at one or more pump wavelengths which are longer than said zero dispersion wavelength ZDW, whereby said dispersion profile causes a soliton red-shift that occurs when said supercontinuum is generated in said nonlinear fiber to be most accelerated at wavelengths at which Raman based soliton energy loss and an increasing mode field diameter cause the soliton red-shift to slow down, thereby overcoming said soliton red-shift slow down and enabling continuing soliton red-shift to longer infrared wavelengths.

2. A supercontinuum light source according to claim 1, wherein said nonlinear fiber is a step-index fiber.

3. A supercontinuum light source according to claim 1, wherein said nonlinear fiber is transparent at a wavelength longer than 3 μm.

4. A supercontinuum light source according to claim 1, wherein said core of said nonlinear fiber comprises a fluoride glass.

5. A supercontinuum light source according to claim 4, wherein said fluoride glass comprises $InF_3$.

6. A supercontinuum light source according to claim 1, wherein said core of said nonlinear fiber comprises a ZBLAN glass.

7. A supercontinuum light source according to claim 1, wherein said pump wavelengths are longer than said zero dispersion wavelength ZDW by 100 nm or more.

8. A supercontinuum light source according to claim 1, wherein the zero dispersion wavelength ZDW is equal to about 1600 nm.

9. A supercontinuum light source according to claim 1, wherein the zero dispersion wavelength ZDW is longer than 1600 nm.

10. A supercontinuum light source according to claim 1, wherein said minimum wavelength is longer than 2 μm.

11. A supercontinuum light source according to claim 1, wherein said pump light source comprises a gain switched laser or a semiconductor laser.

12. A supercontinuum light source according to claim 1, wherein said pump light source comprises a mode locked laser.

13. A supercontinuum light source according to claim 1, wherein said pump light source comprises a pulsed laser configured for emitting pulses having a duration shorter than 100 ps.

14. A supercontinuum light source according to claim 1, wherein said pump light source comprises a pulsed laser configured for emitting pulses having a peak power of more than 0.1 kW.

15. A supercontinuum light source according to claim 1, wherein the nonlinear fiber comprises a fluoride glass fiber having a core diameter smaller than 7 μm.

16. A supercontinuum light source according to claim 1, wherein the nonlinear fiber comprises a fluoride glass fiber having a core diameter larger than 4.5 μm.

17. A supercontinuum light source according to claim 1, wherein the nonlinear fiber has a core diameter between 4 μm and 6.8 μm.

18. A supercontinuum light source according to claim 1, wherein the nonlinear fiber has a numerical aperture of more than 0.25.

19. A supercontinuum light source according to claim 1, wherein the pump light has a bandwidth in the order of 10 nm or less.

20. A supercontinuum light source according to claim 1, wherein the pump light has a bandwidth of 50 nm or wider.

21. A supercontinuum light source according to claim 1, wherein the majority of the output energy in the generated supercontinuum is emitted at wavelengths longer than 1000 nm.

22. A supercontinuum light source according to claim 1, wherein the generated supercontinuum comprises wavelengths between 1500 nm and 4500 nm.

23. A supercontinuum light source according to claim 1, wherein said pump wavelengths are longer than 1.6 μm.

* * * * *